US012770314B2

(12) United States Patent
Zhou et al.

(10) Patent No.: US 12,770,314 B2
(45) Date of Patent: Oct. 20, 2026

(54) PARAMETRIC HAIR MODEL FOR DIGITAL HAIR GENERATION

(71) Applicant: Adobe Inc., San Jose, CA (US)

(72) Inventors: Yi Zhou, San Jose, CA (US); Zhixin Shu, San Jose, CA (US); Xin Sun, Palo Alto, CA (US); Fujun Luan, Sunnyvale, CA (US); Chengan He, New Haven, CT (US)

(73) Assignee: Adobe Inc., San Jose, CA (US)

( * ) Notice: Subject to any disclaimer, the term of this patent is extended or adjusted under 35 U.S.C. 154(b) by 175 days.

(21) Appl. No.: 18/769,233

(22) Filed: Jul. 10, 2024

(65) Prior Publication Data

US 2026/0017865 A1 Jan. 15, 2026

(51) Int. Cl.
*G06T 13/40* (2011.01)
*G06N 3/0475* (2023.01)

(52) U.S. Cl.
CPC .......... *G06T 13/40* (2013.01); *G06N 3/0475* (2023.01); *G06T 2210/36* (2013.01)

(58) Field of Classification Search
None
See application file for complete search history.

(56) References Cited

PUBLICATIONS

Guo et al.,Gan with multivariate disentangling for controllable hair editing, European Conference on Computer Vision, Oct. 23, 2022 (Year: 2022).*

Sklyarova et al., Text-Conditioned Generative Model of 3D Strand-based Human Hairstyles, arXiv.org, arXiv:2312.11666v1 [cs.CV] Dec. 18, 2023 (Year: 2023).*

Abdal, Rameen et al., "Image2StyleGAN: How to Embed Images Into the StyleGAN Latent Space?", 2019 IEEE/CVF International Conference on Computer Vision (ICCV) [retrieved Feb. 20, 2023]. Retrieved from the Internet <https://arxiv.org/pdf/1904.03189.pdf>., Sep. 3, 2019, 23 pages.

Adobe, , "Firefly—Free Generative AI for creatives", Adobe, adobe.com, [retrieved from the internet on Oct. 3, 2024], <https://www.adobe.com/products/firefly.html>, 2024, 11.

Allen, Brett , "The space of human body shapes: reconstruction and parameterization from range scans", Semantic Scholar, semanticscholar.org, [retrieved from the internet on Oct. 7, 2024], <https://www.cs.jhu.edu/~misha/ReadingSeminar/Papers/Allen03.pdf>, Jul. 2003, 8.

(Continued)

*Primary Examiner* — Kee M Tung
*Assistant Examiner* — Biao Chen
(74) *Attorney, Agent, or Firm* — FIG. 1 Patents

(57) ABSTRACT

In implementations of techniques and systems for digital hair generation using a parametric hair model, a processing device receives a shape parameter and a style parameter. The shape parameter represents the overall shape of a hair model, and the style parameter represents local strand details. Based on the shape parameter, a machine-learning model generates guide strands that sparsely represent the hair model. The machine-learning model also generates wisps based on the style parameter. The wisps indicate local strand details for the hair model. The processing device interpolates the wisps onto the guide strands to generate the digital hair model.

20 Claims, 9 Drawing Sheets

(56) References Cited

PUBLICATIONS

Amador Herrera, Jorge A. et al., “DigitalSalon: A Fast Simulator for Dense Hair via Augmented Mass-Spring Model”, University Library, repository.kaust.edu.sa, [retrieved from the internet on Oct. 3, 2024], <https://repository.kaust.edu.sa/bitstreams/7e61dc82-8e22-43ef-bc23-2cc1d5a45dff/download>, Apr. 10, 2024, 12.

Anonymous, , “Perm: A Parametric Hair Model for Multi-Style 3D Hair Generation”, ACM Trans. Graph. 1, 1 (Jan. 2024), 14 pages. https://doi.org/10.1145/nnnnnnn.nnnnnnn, Jan. 2024, 14.

Anonymous, , “Perm: A Parametric Representation for Multi-Style 3D Hair Modeling”, ACM Trans. Graph. 1, 1, 2024, 11.

Anonymous, , “Perm: A Parametric Representation for Multi-Style 3D Hair Modeling—Supplementary Material—”, Anonymous Author(s) Submission ID: 730, 2024, 9.

Autodesk, , “Maya”, Autodesk, autodesk.com, [retrieved from the internet on Oct. 7, 2024], <https://www.autodesk.com/products/maya/>, 2024, 8.

Blanz, Volker et al., “A Morphable Model for the Synthesis of 3D Faces”, Proceedings of the 26th annual conference on Computer graphics and interactive techniques [retrieved Aug. 31, 2022]. Retrieved from the Internet <https://redwood.berkeley.edu/wp-content/uploads/2018/08/Blanz-siggraph-99.pdf>., Jul. 1, 1999, 8 Pages.

Bouritsas, Giorgos et al., Cornell University, arXiv.org, [retrieved from the internet on Oct. 7, 2024], <https://arxiv.org/pdf/1905.02876>, Aug. 3, 2019, 10.

Cao, Chen et al., “FaceWarehouse: a 3D Facial Expression Database for Visual Computing”, Semantic Scholar, semanticscholar.org, [retrieved from the internet on Oct. 7, 2024], <http://kunzhou.net/2012/facewarehouse-tr.pdf>, Mar. 1, 2014, 11.

Chai, Menglei et al., “A Reduced Model for Interactive Hairs”, Semantic Scholar, semanticscholar.org, [retrieved from the internet on Oct. 7, 2024], <https://www.cs.columbia.edu/~cxz/publications/reduced_hair.pdf>, Jul. 27, 2014, 11.

Chai, Menglei et al., “Adaptive Skinning for Interactive Hair-Solid Simulation”, Columbia University, columbia.edu, [retrieved from the internet on Oct. 7, 2024], <https://www.cs.columbia.edu/~cxz/publications/hair_collision.pdf>, 2016, 13.

Chai, Menglei et al., “AutoHair: Fully Automatic Hair Modeling from a Single Image”, Github, github.io, [retrieved from the internet on Oct. 7, 2024], <https://svbrdf.github.io/publications/autohair/autohair.pdf>, Jul. 24, 2016, 12.

Chai, Menglei et al., “Dynamic Hair Manipulation in Images and Videos”, Semantic Scholar, semanticscholar.org, [retrieved from the internet on Oct. 7, 2024], <http://www.kunzhou.net/2013/hair-sig2013.pdf>, 2013, 8.

Chai, Menglei et al., “Single-View Hair Modeling for Portrait Manipulation”, ResearchGate, researchgate.net, [retrieved from the internet on Oct. 7, 2024], Jul. 2012, 9.

Chan, Eric R. et al., “Efficient Geometry-aware 3D Generative Adversarial Networks”, Cornell University arXiv, arXiv.org [retrieved Mar. 19, 2023]. Retrieved from the Internet <https://arxiv.org/pdf/2112.07945.pdf>., Apr. 27, 2022, 27 Pages.

Chen, Lieu-Hen et al., “A system of 3D hair style synthesis based on the wisp model”, Semantic Scholar, semanticscholar.org, [retrieved from the internet on Oct. 7, 2024], <http://www.miv.t.u-tokyo.ac.jp/papers/chenVCpaper99.pdf>, 1999, 12.

Cignoni, Paolo et al., “MeshLab: an Open-Source Mesh Processing Tool”, Eurographics Digital Library, diglib.eg.org, [retrieved from the internet on Oct. 5, 2024], <https://diglib.eg.org/server/api/core/bitstreams/eb20f1e6-5138-42bf-8b32-f4326a619969/content>, 2008, 8.

Feng, Yao et al., “Learning an Animatable Detailed 3D Face Model from In-The-Wild Images”, Cornell University, arXiv.org, [retrieved from the internet on Oct. 7, 2024], <https://arxiv.org/pdf/2012.04012>, Jun. 2, 2021, 22.

Feng, Yao et al., “Learning Disentangled Avatars with Hybrid 3D Representations”, Cornell University, arXiv.org, [retrieved from the internet on Oct. 3, 2024], <https://arxiv.org/pdf/2309.06441>, Sep. 12, 2023, 16.

Fu, Hongbo et al., “Sketching Hairstyles”, EG DigLib, diglib.eg.org, [retrieved from the internet on Oct. 7, 2024], <https://diglib.eg.org/server/api/core/bitstreams/2a4441b2-6b24-4b2f-9d7a-aba8de7e9277/content>, 2007, 6.

Goodfellow, Ian J. et al., “Generative Adversarial Nets”, In: Advances in neural information processing systems (2014) [retrieved Feb. 21, 2023]. Retrieved from the Internet <https://www.cs.utah.edu/~zhe/teach/archived/2019f/6190-pdf/gans.pdf>., Jun. 10, 2014, 9 pages.

Grabli, Stephane et al., “Image-Based Hair Capture by Inverse Lighting”, HAL Open Science, hal.science, [retrieved from the internet on Oct. 8, 2024], <https://inria.hal.science/inria-00510036/file/grabliGI02.pdf>, 2002, 9.

He, Chengan et al., “Digital Salon: An AI and Physics-Driven Tool for 3D Hair Grooming and Simulation”, [retrieved from the internet on Oct. 8, 2024], <https://digital-salon.github.io/index.html>, 2024, 5 pages.

He, Chengan et al., “Perm: A Parametric Representation for Multi-Style 3D Hair Modeling”, Cornell University, arXiv.org, [retrieved from the internet on Oct. 4, 2024], <https://arxiv.org/pdf/2407.19451>, Aug. 8, 2024, 11.

Herrera, Thomas L. et al., “Lighting Hair From the Inside: A Thermal Approach to Hair Reconstruction”, ResearchGate, researchgate.net, [retrieved from the internet on Oct. 7, 2024], Dec. 2012, 10.

Hesse, Nikolas et al., “Learning an Infant Body Model from RGB-D Data for Accurate Full Body Motion Analysis”, Hal Inria, inria.hal.science, [retrieved from the internet on Oct. 7, 2024], <https://inria.hal.science/hal-02162177v1/file/hesseMiccai18.pdf>, Jun. 21, 2019, 9.

Ho, Jonathan et al., “Denoising Diffusion Probabilistic Models”, Cornell University, arXiv.org, [retrieved from the internet on Oct. 8, 2024], <https://arxiv.org/pdf/2006.11239>, Dec. 016, 2020, 25.

Ho, Jonathan et al., “Denoising Diffusion Probabilistic Models”, Cornell University arXiv, arXiv.org [retrieved Feb. 24, 2022]. Retrieved from the Internet <https://arxiv.org/pdf/2006.11239.pdf>., Dec. 16, 2020, 25 Pages.

Hu, Jie et al., “Squeeze-and-Excitation Networks”, Apr. 5, 2018, 11 pages.

Hu, Liwen et al., “Robust Hair Capture Using Simulated Examples”, Semantic Scholar, semanticscholar.org, [retrieved from the internet on Oct. 7, 2024], <https://www.hao-li.com/publications/papers/siggraph2014RHCUSE.pdf>, Jul. 27, 2014, 10.

Hu, Liwen et al., “Single-View Hair Modeling Using a Hairstyle Database”, Semantic Scholar, semanticscholar.org, [retrieved from the internet on Oct. 5, 2024], <https://www.hao-li.com/publications/papers/siggraph2015SVHMUAHD.pdf>, Jul. 2015, 9.

Isola, Phillip et al., “Image-to-Image Translation with Conditional Adversarial Networks”, 2017 IEEE Conference on Computer Vision and Pattern Recognition (CVPR) [retrieved Feb. 19, 2023]. Retrieved from the Internet <https://gangw.web.illinois.edu/class/cs598/papers/CVPR17-img2img.pdf>., Nov. 22, 2017, 17 pages.

Jakob, Wenzel et al., “Capturing Hair Assemblies Fiber by Fiber”, Realistic Graphics Lab, rgl.epfl.ch, [retrieved from the internet on Oct. 7, 2024], <https://rgl.s3.eu-central-1.amazonaws.com/media/papers/Jakob2009Capturing.pdf>, 2009, 9.

Karras, Tero et al., “A Style-Based Generator Architecture for Generative Adversarial Networks”, Cornell University arXiv, arXiv.org [retrieved Jun. 28, 2023]. Retrieved from the Internet <https://arxiv.org/pdf/1812.04948.pdf>., Mar. 29, 2019, 12 pages.

Karras, Tero et al., “Analyzing and Improving the Image Quality of StyleGAN”, Cornell University arXiv, arXiv.org [retrieved Feb. 20, 2023]. retrieved from the Internet <https://arxiv.org/pdf/1912.04958.pdf>., Dec. 2019, 21 Pages.

Kim, Tae-Yong et al., “Interactive Multiresolution Hair Modeling and Editing”, Semantic Scholar, semanticscholar.org, [retrieved from the internet on Oct. 7, 2024], <https://courses.cs.washington.edu/courses/cse590b/04au/p620-kim.pdf>, Jul. 1, 2002, 10.

Kingma, Diederik P. et al., “Adam: A Method for Stochastic Optimization”, Cornell University, arXiv Preprint, arXiv.org [retrieved

(56) References Cited

PUBLICATIONS

Aug. 9, 2023]. Retrieved from the Internet <https://arxiv.org/pdf/1412.6980.pdf>., Jan. 30, 2017, 15 pages.
Kingma, Diederik P. et al., "Auto-Encoding Variational Bayes", Cornell University arXiv, arXiv.org [retrieved Aug. 9, 2023]. Retrieved from the Internet <https://arxiv.org/pdf/1312.6114.pdf>., May 1, 2014, 14 Pages.
Kuang, Zhiyi et al., "DeepMVSHair: Deep Hair Modeling from Sparse Views", Semantic Scholar, semanticscholar.org, [retrieved from the internet on Oct. 8, 2024], <http://kunzhou.net/2022/hair-siga22.pdf>, Nov. 29, 2022, 8.
Laine, Samuli et al., "Modular Primitives for High-Performance Differentiable Rendering", Cornell University, arXiv.org, [retrieved from the internet on Oct. 4, 2024], <https://arxiv.org/pdf/2011.03277>, Nov. 6, 2020, 14.
Li, Tianye et al., "Learning a model of facial shape and expression from 4D scans", ACM Digital Library, dl.acm.org, [retrieved from the internet on Oct. 7, 2024], <https://dl.acm.org/doi/epdf/10.1145/3130800.3130813>, Nov. 20, 2017, 17.
Liang, Shu et al., "Video to Fully Automatic 3D Hair Model", Cornell University, arXiv.org, [retrieved from the internet on Oct. 7, 2024], <https://arxiv.org/pdf/1809.04765>, 9/13/218, 15.
Loper, Matthew et al., "SMPL: a skinned multi-person linear model", ACM Transactions on Graphics, vol. 34, No. 6 [retrieved Feb. 19, 2023]. Retrieved from the Internet <https://www.researchgate.net/publication/287815055_SMPL_a_skinned_multi-person_linear_model>., Nov. 2, 2015, 16 Pages.
Loshchilov, Ilya et al., "Decoupled Weight Decay Regularization", Cornell University arXiv, arXiv.org [retrieved Aug. 9, 2023]. Retrieved from the Internet <https://arxiv.org/pdf/1711.05101.pdf>., Jan. 4, 2019, 19 Pages.
Luo, Haimin et al., "GaussianHair: Hair Modeling and Rendering with Light-aware Gaussians", Cornell University, arXiv.org, [retrieved from the internet on Oct. 8, 2024], <https://arxiv.org/pdf/2402.10483v1>, Feb. 16, 2024, 19.
Luo, Linjie et al., "Structure-Aware Hair Capture", Princeton Graphics Group, gfx.cs.princeton.edu, [retrieved from the internet on Oct. 4, 2024], <https://gfx.cs.princeton.edu/pubs/Luo_2013_SHC/structure-hair.pdf>, Jul. 2013, 11.
Luo, Zhongjin et al., "RaBit: Parametric Modeling of 3D Biped Cartoon Characters with a Topological-consistent Dataset", Cornell University, arXiv.org, [retrieved from the internet on Oct. 7, 2024], <https://arxiv.org/pdf/2303.12564>, Mar. 24, 2023, 14.
Lyu, Qing et al., "Real-Time Hair Simulation with Neural Interpolation", mlchai.com, [retrieved from the internet on Oct. 7, 2024], <https://mlchai.com/files/lyu2020real.pdf>, 2020, 13.
Mahmood, Naureen et al., "AMASS: Archive of Motion Capture as Surface Shapes", Cornell University arXiv, arXiv.org [retrieved Aug. 18, 2024]. Retrieved from the Internet <https://arxiv.org/pdf/1904.03278>, 2019, 12 pages.
Mescheder, Lars et al., "Which Training Methods for GANs do actually Converge?", Cornell University, arXiv.org, [retrieved from the internet on Oct. 7, 2024], <https://arxiv.org/pdf/1801.04406>, Jul. 31, 2018, 39.
Nam, Giljoo et al., "Strand-accurate Multi-view Hair Capture", Semantic Scholar, semanticscholar.org, [retrieved from the internet on Oct. 7, 2024], <https://openaccess.thecvf.com/content_CVPR_2019/papers/Nam_Strand-Accurate_Multi-View_Hair_Capture_CVPR_2019_paper.pdf>, Jun. 1, 2019, 10.
Olszewski, Kyle et al., "Intuitive, Interactive Beard and Hair Synthesis with Generative Models", Cornell University arXiv, arXiv.org [retrieved Jan. 30, 2023]. Retrieved from the Internet <https://arxiv.org/pdf/2004.06848.pdf>., Apr. 15, 2020, 16 Pages.
Paris, Sylvain et al., "Capture of hair geometry from multiple images", Semantic Scholar, semanticscholar.org, [retrieved from the internet on Oct. 8, 2024], <https://artis.inrialpes.fr/Publications/2004/PBS04/paper0120_hair_capture_ready.pdf>, 8, Aug. 1, 2004.
Pavlakos, Georgios et al., "Expressive Body Capture: 3D Hands, Face, and Body from a Single Image", Cornell University arXiv, arXiv.org [retrieved Aug. 18, 2024]. Retrieved from the Internet <https://arxiv.org/pdf/1904.05866>, 2019, 22 pages.
Ranjan, Anurag et al., "Generating 3D faces using Convolutional Mesh Autoencoders", Cornell University, arXiv.org, [retrieved from the internet on Oct. 7, 2024], <https://arxiv.org/pdf/1807.10267>, Jul. 31, 2018, 21.
Richardson, Elad et al., "Encoding in Style: A StyleGAN Encoder for Image-to-Image Translation", Cornell University arXiv, arXiv.org [retrieved Feb. 20, 2023]. Retrieved from the Internet <https://arxiv.org/pdf/2008.00951.pdf>., Aug. 2020, 21 Pages.
Romero, Javier et al., "Embodied Hands: Modeling and Capturing Hands and Bodies Together", Cornell University, arXiv.org, [retrieved from the internet on Oct. 7, 2024], <https://arxiv.org/pdf/2201.02610>, Jan. 7, 2022, 19.
Ronneberger, Olaf et al., "U-Net: Convolutional Networks for Biomedical Image Segmentation", Cornell University arXiv, arXiv.org [retrieved Mar. 16, 2023]. Retrieved from the Internet <https://arxiv.org/pdf/1505.04597.pdf>., May 18, 2015, 8 pages.
Rosu, Radu A. et al., "Neural Strands: Learning Hair Geometry and Appearance from Multi-View Images", Cornell University, arXiv.org, [retrieved from the internet on Oct. 7, 2024], <https://arxiv.org/pdf/2207.14067>, Jul. 28, 2022, 17.
Rosu, Radu Alexandru et al., "Neural Strands: Learning Hair Geometry and Appearance from Multi-View Images", Cornell University arXiv, arXiv.org [retrieved Mar. 19, 2023]. Retrieved from the Internet <https://arxiv.org/pdf/2207.14067.pdf>., Jul. 28, 2022, 17 Pages.
Saito, Shunsuke et al., "3D Hair Synthesis Using Volumetric Variational Autoencoders", Semantic Scholar, semanticscholar.org, [retrieved from the internet on Oct. 7, 2024], <https://vgl.ict.usc.edu/Research/3DHairSynthesis/3DHairSynthesis.pdf>, Dec. 4, 2018, 12.
Shen, Yuefan et al., "CT2Hair: High-Fidelity 3D Hair Modeling using Computed Tomography", AMC Digital Library, https://dl.acm.org/, [retrieved from the internet on Oct. 4, 2024], <https://dl.acm.org/doi/10.1145/3592106>, Aug. 2023, 13.
Shen, Yuefan et al., "DeepSketchHair: Deep Sketch-based 3D Hair Modeling", Cornell University, arXiv.org, [retrieved from the internet on Oct. 7, 2024], <https://arxiv.org/pdf/1908.07198>, Aug. 20, 2019, 14.
Sklyarova, Vanessa et al., "Neural Haircut: Prior-Guided Strand-Based Hair Reconstruction", Cornell University, arXiv.org, [retrieved from the internet on Oct. 5, 2024], <https://arxiv.org/html/2306.05872>, Jun. 12, 2023, 23.
Sklyarova, Vanessa et al., "Text-Conditioned Generative Model of 3D Strand-based Human Hairstyles", Cornell University, arXiv.org, [retrieved from the internet on Oct. 7, 2024], <https://arxiv.org/pdf/2312.11666>, Dec. 18, 2023, 17.
Takimoto, Yusuke et al., "Dr.Hair: Reconstructing Scalp-Connected Hair Strands without Pre-Training via Differentiable Rendering of Line Segments", Cornell University, arXiv.org, [retrieved from the internet on Oct. 8, 2024], <https://arxiv.org/pdf/2403.17496>, Mar. 29, 2024, 22.
Tan, Zhentao et al., "MichiGAN: multi-input-conditioned hair image generation for portrait editing", ACM Digital Library, dl.acm.org, [retrieved from the internet on Oct. 7, 2024], <https://dl.acm.org/doi/10.1145/3386569.3392488>, Jul. 2020, 13.
Tewari, Ayush et al., "State of the Art on Neural Rendering", Cornell University, arXiv.org, [retrieved from the internet on Oct. 4, 2024], <https://arxiv.org/pdf/2004.03805>, Apr. 8, 2020, 27.
Wang, Lvdi et al., "Example-Based Hair Geometry Synthesis", Academia, academia.edu, [retrieved from the internet on Oct. 5, 2024], 2009, 9.
Wang, Ziyan et al., "A Local Appearance Model for Volumetric Capture of Diverse Hairstyles", Cornell University, arXiv.org, [retrieved from the internet on Oct. 7, 2024], <https://arxiv.org/pdf/2312.08679>, Dec. 14, 2023, 17.
Wang, Ziyan et al., "HVH: Learning a Hybrid Neural Volumetric Representation for Dynamic Hair Performance Capture", Cornell University, arXiv.org, [retrieved from the internet on Oct. 7, 2024], <https://arxiv.org/pdf/2112.06904>, Dec. 19, 2021, 16.
Wang, Ziyan et al., "NeuWigs: A Neural Dynamic Model for Volumetric Hair Capture and Animation", Computer Vision Foundation, openaccess.thecvf.com, [retrieved from the internet on Oct.

(56) References Cited

PUBLICATIONS 7, 2024], <https://openaccess.thecvf.com/content/CVPR2023/papers/Wang_NeuWigs_A_Neural_Dynamic_Model_for_Volumetric_Hair_Capture_and_CVPR_2023_paper.pdf>, 2023, 11.
Ward, Kelly et al., "A Survey on Hair Modeling: Styling, Simulation, and Rendering", HAL Open Science, hal.science, [retrieved from the internet on Oct. 7, 2024], <hal.science/hal-00171407>, 2007, 22.
Watanabe, Yasuhiko et al., "A trigonal prism-based method for hair image generation", IEEE Computer Graphics and Applications, vol. 12, Issue 1, Jan. 1992, 7 pages.
Wei, Yichen et al., "Modeling Hair from Multiple Views", Research Gate, researchgate.net , [retrieved from the internet on Oct. 8, 2024], Jul. 2005, 6.
Weng, Yanlin et al., "Hair Interpolation for Portrait Morphing", Netlify, pableeto.netlify.app, [retrieved from the internet on Oct. 5, 2024], <https://research.lvdi.wang/publications/hairmorph/2013_hairmorph.pdf>, Jul. 2013, 6.
Wu, Keyu et al., "MonoHair: High-Fidelity Hair Modeling from a Monocular Video", Cornell University, arXiv.org, [retrieved from the internet on Oct. 8, 2024], <https://arxiv.org/pdf/2403.18356>, Mar. 27, 2024, 16.
Wu, Keyu et al., "NeuralHDHair: Automatic High-fidelity Hair Modeling from a Single Image Using Implicit Neural Representations", Cornell University, arXiv.org, [retrieved from the internet on Oct. 7, 2024], <https://arxiv.org/pdf/2205.04175>, May 9, 2022, 11.
Xia, Weihao et al., "GAN Inversion: A Survey", Cornell University arXiv, arXiv.org [retrieved Jan. 21, 2022]. Retrieved from the Internet <https://arxiv.org/pdf/2101.05278.pdf>., Aug. 13, 2021, 21 Pages.
Xiao, Chufeng et al., "Sketchhairsalon: Deep sketch-based hair image synthesis", Cornell University arXiv, arXiv.org [retrieved Jan. 30, 2023]. Retrieved from the Internet <https://arxiv.org/pdf/2109.07874.pdf>., Sep. 21, 2021, 21 Pages.
Xing, Jun et al., "HairBrush for Immersive Data-Driven Hair Modeling", HAL Open Science, hal.science, [retrieved from the internet on Oct. 7, 2024], <https://hal.science/hal-02265931>, Oct. 20, 2019, 18.
Xu, Zexiang et al., "Dynamic Hair Capture using Spacetime Optimization", Columbia University, columbia.edu, [retrieved from the internet on Oct. 7, 2024], <https://www.cs.columbia.edu/~cxz/publications/haircap14.pdf>, Nov. 2014, 11.
Yang, Lingchen et al., "Dynamic Hair Modeling from Monocular Videos using Deep Neural Networks", Semantic Scholar, semanticscholar.org, [retrieved from the internet on Oct. 5, 2024], <http://www.cad.zju.edu.cn/home/zyy/docs/dynamic_hair.pdf>, Aug. 2019, 12.
Yuksel, Cem et al., "Hair Meshes", cemyuksel.com, [retrieved from the internet on Oct. 7, 2024], <http://www.cemyuksel.com/research/hairmeshes/hairmeshes.pdf>, 2009, 7.
Zhang, Meng et al., "A Data-driven Approach to Four-view Image-based Hair Modeling", Semantic Scholar, semanticscholar.org, [retrieved from the internet on Oct. 7, 2024], <http://www.cad.zju.edu.cn/home/hwu/publications/4viewhair/4viewhair.pdf>, Jul. 20, 2017, 11.
Zhang, Meng et al., "Hair-GAN: Recovering 3D hair structure from a single image using generative adversarial networks", Science Direct, sciencedirect.com, [retrieved from the internet on Oct. 7, 2024], <https://www.sciencedirect.com/science/article/pii/S2468502X18300652?via%3Dihub>, 2019, 11.
Zhang, Meng et al., "Modeling hair from an RGB-D camera", cad.zju.edu, [retrieved from the internet on Oct. 7, 2024], <http://www.cad.zju.edu.cn/home/zyy/docs/rgbd_hair.pdf>, Dec. 4, 2018, 11.
Zheng, Yujian et al., "HairStep: Transfer Synthetic to Real Using Strand and Depth Maps for Single-View 3D Hair Modeling", Cornell University, arXiv.org, [retrieved from the internet on Oct. 5, 2024], <https://arxiv.org/pdf/2303.02700>, Mar. 24, 2023, 17.
Zhou, Yi et al., "Fully Convolutional Mesh Autoencoder using Efficient Spatially Varying Kernels", Cornell University, arXiv.org, [retrieved from the internet on Oct. 7, 2024], <https://arxiv.org/pdf/2006.04325>, Oct. 21, 2020, 14.
Zhou, Yi et al., "HairNet: Single-View Hair Reconstruction using Convolutional Neural Networks", Cornell University, arXiv.org, [retrieved from the internet on Oct. 7, 2024], <https://arxiv.org/pdf/1806.07467>, Jul. 10, 2018, 21.
Zhou, Yuxiao et al., "GroomGen: A High-Quality Generative Hair Model Using Hierarchical Latent Representations", Cornell University, arXiv.org, [retrieved from the internet on Oct. 3, 2024], <https://arxiv.org/pdf/2311.02062>, Nov. 16, 2023, 16.
Zuffi, Silvia et al., "3D Menagerie: Modeling the 3D Shape and Pose of Animals", Cornell University, arXiv.org, [retrieved from the internet on Oct. 7, 2024], <https://arxiv.org/pdf/1611.07700>, Apr. 12, 2017, 9.

* cited by examiner

PARAMETRIC HAIR MODEL FOR DIGITAL HAIR GENERATION

BACKGROUND

Creating realistic digital hair models is important for various applications, including generating digital humans. Despite advancements in digital capture and generative systems, creating high-quality three-dimensional (3D) hair models remains difficult due to the complexity and variability of hair. Some conventional techniques use volumetric representations to generate 3D hair, but these conventional techniques are challenging to animate and not easily integrated into existing rendering systems. An alternative approach is to represent hair with strands, which are easier to animate. However, creating a hairstyle with guide strands is labor-intensive and time-consuming, as artists manually adjust the guide strands and parameters to fill out the 3D hairstyle. This conventional process leads to increased computational resource consumption, reduced user efficiency, and limited flexibility in exploring different ideas.

SUMMARY

Techniques and systems for parametric hair modeling for digital hair generation are described. In one example, a processing device receives shape and style parameters. The shape parameter represents the overall shape of a digital 3D hair model, while the style parameter represents local strand details. A machine-learning model generates guide strands, which provide a sparse representation of the hair model, based on the shape parameter. The machine-learning model also uses the style parameter to generate wisps that provide local strand details. The processing device then interpolates the wisps onto the guide strands to generate the 3D hair model.

This Summary introduces a simplified selection of concepts that are further described below in the Detailed Description. As such, this Summary is not intended to identify essential features of the claimed subject matter or to aid in determining its scope.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
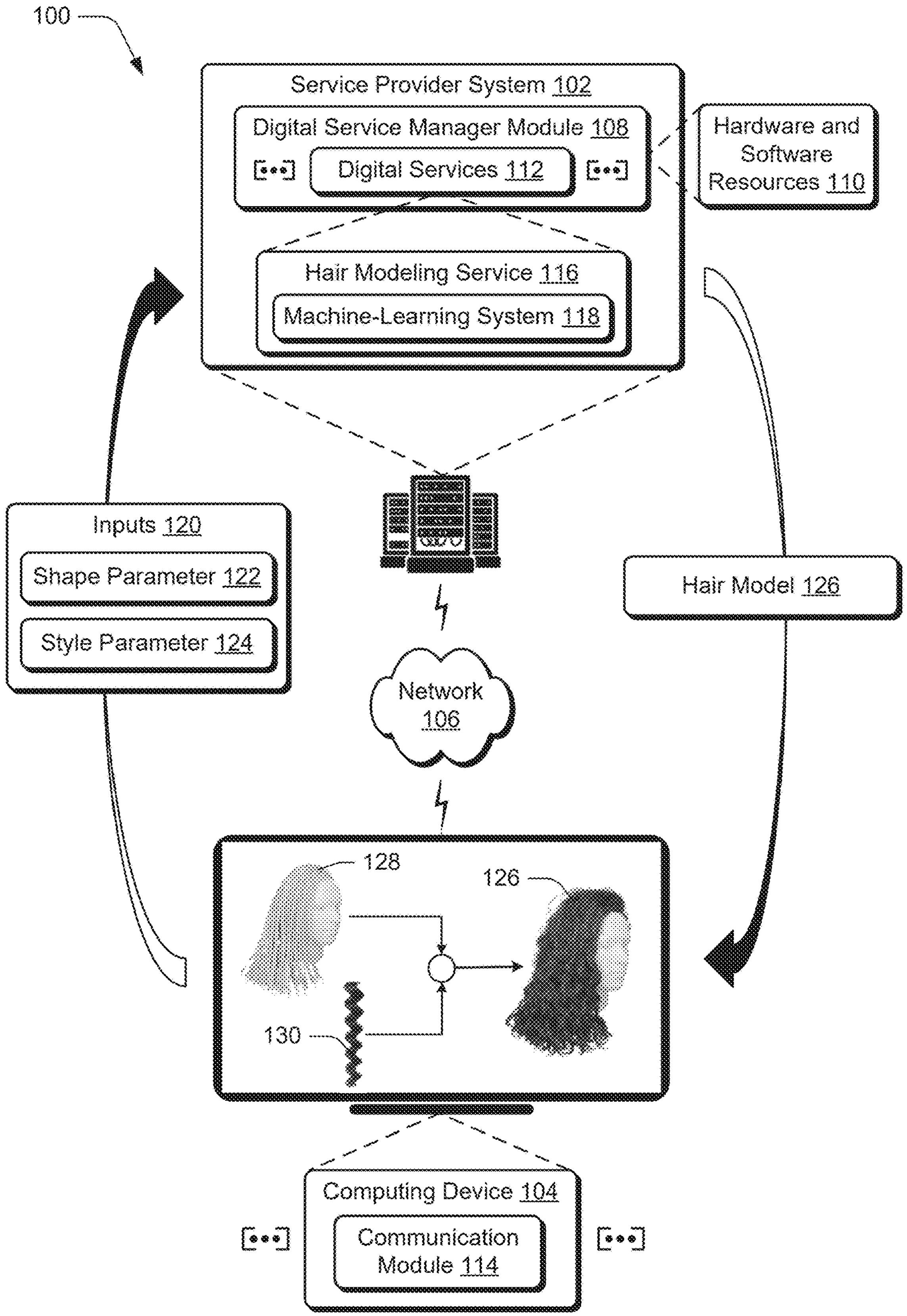
FIG. 1 illustrates a digital medium environment in an example implementation that is operable to employ parametric hair model techniques for digital hair generation as described herein.

Hair modeling is employed by the movie industry and the visual effects community to create lifelike digital humans. Despite advancements in high-end capture systems, creating high-quality hair models remains difficult due to hair's intricate and variable nature. In particular, the unorganized hair structure makes the modeling time-consuming and challenging.

One conventional method involves volumetric occupancy and orientation fields, either explicitly or implicitly, to create 3D hair. Volumetric fields act as an intermediate spatial-aware representation for encoding the hair. This approach utilizes deep learning techniques to non-linearly represent a wide range of data in a 3D hair dataset. However, animating volumetric representations is complex and is not easily integrated into existing rendering systems. Moreover, entangled volumetric fields are not well-suited for representing many hair types, including curly and kinky styles.

Another conventional technique uses strands, which are easier to animate, to represent hair. Users draw sparse guide strands to define a hairstyle. The guide strands are then groomed and interpolated to generate the final hair model. Creating a hairstyle with guide strands is labor-intensive and requires iterative manual adjustments to the guide strands and parameters. As a result, this conventional approach makes hair modeling a long and tedious process.

While these conventional techniques for 3D hair generation have improved over time, they often overlook the dual-faceted nature of hair. Hairstyles with similar overall shapes very often have variations in local details. For instance, hairstyles with a similar shape can have variations ranging from a sleek and smooth straight look to more modern styles with beach waves or bouncy curls, depending on a person's natural hairstyle or the blow-drying techniques used. Neglecting this multifaceted nature limits the generation and editing capabilities of conventional hair generation techniques. For example, conventional techniques struggle to change a hairstyle from straight to curly while maintaining a similar haircut shape. Additionally, these conventional approaches are often specialized for specific tasks and cannot adapt to different tasks in a flexible manner.

To address these issues, the systems and techniques described here use an adaptable deep learning approach to create high-fidelity 3D hair with detailed geometric features and independent controls. A learned parametric model is designed with two parameters to control the global shape (e.g., guide strands) and local strand details (e.g., wisps), generating a wide range of realistic hairstyles. In particular, the output hair depends on a guide strand parameter for its global shape and a hair style parameter for its local details, while a pre-defined root set is often used for hair density. Unlike conventional techniques that jointly model the hair shape and local strand details, the described techniques disentangle these two aspects using a principal component analysis (PCA)-based strand representation in the frequency domain. The PCA-based representation fits the nearly periodic behavior of hair strands, with the learned principal components creating an explainable space for hair decomposition. In particular, initial components capture low-frequency information (e.g., rough shape and large deformations) and subsequent components encode high-frequency details (e.g., curliness). These principal components produce a parameter space that facilitates efficient hair decomposition.

In the described approach, geometry textures are employed to represent different hairstyles. The geometry textures are decomposed into guide textures for the guide strands and residual textures for local strand details. In this way, the described techniques facilitate precise editing and output control of a hair model's overall shape and/or local strand details. The decomposed texture maps are further parameterized with various generative models to replicate typical stages in conventional hair modeling systems.

In an example implementation, a neural network of a machine-learning model is trained for guide textures to serve as an automated guide strand authoring system based on a shape parameter. Another neural network of the machine-learning model is trained based on a style parameter for residual textures, which replaces manual design with learned parameters. Finally, upsampled guide textures and the residual textures are sampled and decoded to generate digital hair models. The end result is a fully parametric representation of 3D hair, providing separate parameters to control the overall hair shape and local strand details.

The described approach allows for more precise editing and output control for various hair applications. Specifically, the described machine-learning model offers end-to-end parameter optimization, allowing direct integration into existing hair modeling pipelines and industrial software frameworks. The trained neural networks solve task-agnostic problems related to 3D hair generation and demonstrate flexibility and effectiveness in tasks such as 3D hair parameterization, hairstyle interpolation, single-view hair reconstruction, and hair-conditioned image generation.

In one or more examples, inputs are received by a processing device. The inputs include a shape parameter that represents the overall shape of a hair model and a style parameter that represents local strand details. The shape parameter, for instance, indicates a shoulder-length haircut. In this example, the style parameter indicates wavy hair with tight curls.

A machine-learning model generates guide strands based on the shape parameter. The guide strands provide a sparse representation of the hair model. Continuing the previous example, the guide strands include a sparse set of guide strands (e.g., 400 strands) to shape the hair model. Based on the style parameter, the machine-learning model also generates wisps that provide local strand details. For example, the wisps indicate that the strands are generally curly. The processing device then generates the digital hair model by interpolating the wisps onto the guide strands.

The following discussion describes an example environment that employs the techniques described herein. Example procedures are also described as performable in the example environment and other environments. Consequently, the performance of the example procedures is not limited to the example environment, and the example environment is not limited to the performance of the example procedures.

Example Digital Hair Generation Environment

FIG. 1 illustrates a digital medium environment 100 in an example implementation that is operable to employ parametric hair model techniques for digital hair generation as described herein. The illustrated digital medium environment 100 includes a service provider system 102 and a computing device 104 that are communicatively coupled, one to another, via a network 106. Computing systems for the service provider system 102 and the computing device 104 are configurable in a variety of ways. For instance, computing device 104 is associated with a user, and service provider system 102 is a remote computing system (e.g., one or more servers) configured to employ the described techniques and systems for digital hair modeling.

A computing system, for instance, is configurable as a desktop computer, laptop computer, mobile device (e.g., assuming a handheld configuration such as a tablet or mobile phone), server, and so forth. Thus, the service provider system 102 or the computing device 104 is capable of ranging from a full-resource device with substantial memory and processor resources (e.g., servers and personal computers) to a low-resource device with limited memory and/or processing resources (e.g., some mobile devices). Additionally, although a single computing device is shown for the computing device 104 and described in instances in the following discussion, a computing system is also representative of a plurality of different devices, such as multiple servers utilized by a business to perform operations "over the cloud" for the service provider system 102 and as further described in relation to FIG. 9.

The service provider system 102 includes a digital service manager module 108 implemented using hardware and software resources 110 (e.g., a processing device and computer-readable storage medium) to support one or more digital services 112. Digital services 112 are made available remotely via the network 106 to computing devices, e.g., computing device 104.

Digital services 112 are scalable through implementation by the hardware and software resources 110 and support a variety of functionalities, including accessibility, verification, real-time processing, analytics, load balancing, and so forth. Examples of digital services include a social media service, streaming service, digital content repository service, content collaboration service, and so on. Accordingly, in the illustrated example, a communication module 114 (e.g., browser, network-enabled application, and so on) is utilized by the computing device 104 to access the digital services 112 via the network 106. A result of processing using the digital services 112 is then returned to the computing device 104 via the network 106.

In the illustrated digital medium environment 100, the digital services 112 include a hair modeling service 116 for generating digital 3D hair. Although illustrated as implemented remotely by the service provider system 102, functionality of the hair modeling service 116 is also configurable for implementation locally, e.g., as part of the communication module 114 at the computing device 104. The hair modeling service 116 is configured to leverage generative artificial intelligence (AI) techniques implemented using a machine-learning system 118 (e.g., one or more machine-learning models) to generate digital hair models.

To do so, the hair modeling service 116 uses the machine-learning system 118 to process inputs 120 to generate a hair model 126. The inputs 120 include a shape parameter 122 and a style parameter 124. The shape parameter 122 controls the global or overall hair shape. The style parameter 124 controls the local strand details. For example, given a shape parameter 122 (e.g., shoulder length hair) and a style parameter 124 (e.g., curly hair), the hair modeling service 116 is tasked with generating the hair model 126 with the desired overall shape and style.

The shape parameter 122 serves as a sparse representation of the full hair shape for the hair model 126. In one implementation, the shape parameter 122 is provided as a numerical value representative of an overall hair shape. To determine a desired value for the shape parameter 122, a user interface of the computing device 104 displays guide strands 128 associated with a particular value of the shape parameter 122. For example, users select the desired guide strands 128 from a plurality of preloaded options, each with a predetermined shape parameter value. In another implementation, a visual representation of the guide strands 128 is updated as the user adjusts the numerical value of the shape parameter 122. In yet another implementation, the numerical value of the shape parameter 122 is updated as the user adjusts a visual representation of the guide strands 128.

The style parameter 124 captures local details (e.g., high-frequency curliness and randomness) for the hair model 126. In one implementation, the style parameter 124 is provided as a numerical value representative of local strand details. To determine a desired value for the style parameter 124, a user interface of the computing device 104 displays wisps 130 associated with a particular value of the style parameter 124. For example, users select the desired wisps 130 from a plurality of preloaded options. In another implementation, a visual representation of the wisps 130 is updated as the user adjusts the numerical value of the style parameter 124 or vice-versa.

The described hair modeling service 116 leverages a learned parametric model of human 3D hair to generate the hair model 126. Unlike conventional systems that model the global hair shape and local strand details together, the hair modeling service 116 disentangles the hair shape and strand details as separate parameters (e.g., the shape parameter 122 and style parameter 124) using a PCA-based strand representation in the frequency domain. This disentanglement allows for more precise editing and output control of the hair model 126. Specifically, the hair modeling service 116 fits and decomposes hair geometry textures into low-frequency and high-frequency hair structures. Visually, the hair modeling service 116 interpolates the wisps 130 (associated with the style parameter 124) onto the guide strands 128 (associated with the shape parameter 122) to generate the hair model 126. Further discussion of the operation of the hair modeling service 116 as performing digital hair generation with customizable shape and styling is described in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Digital Hair Generation Using a Parametric Model

Figure 2:
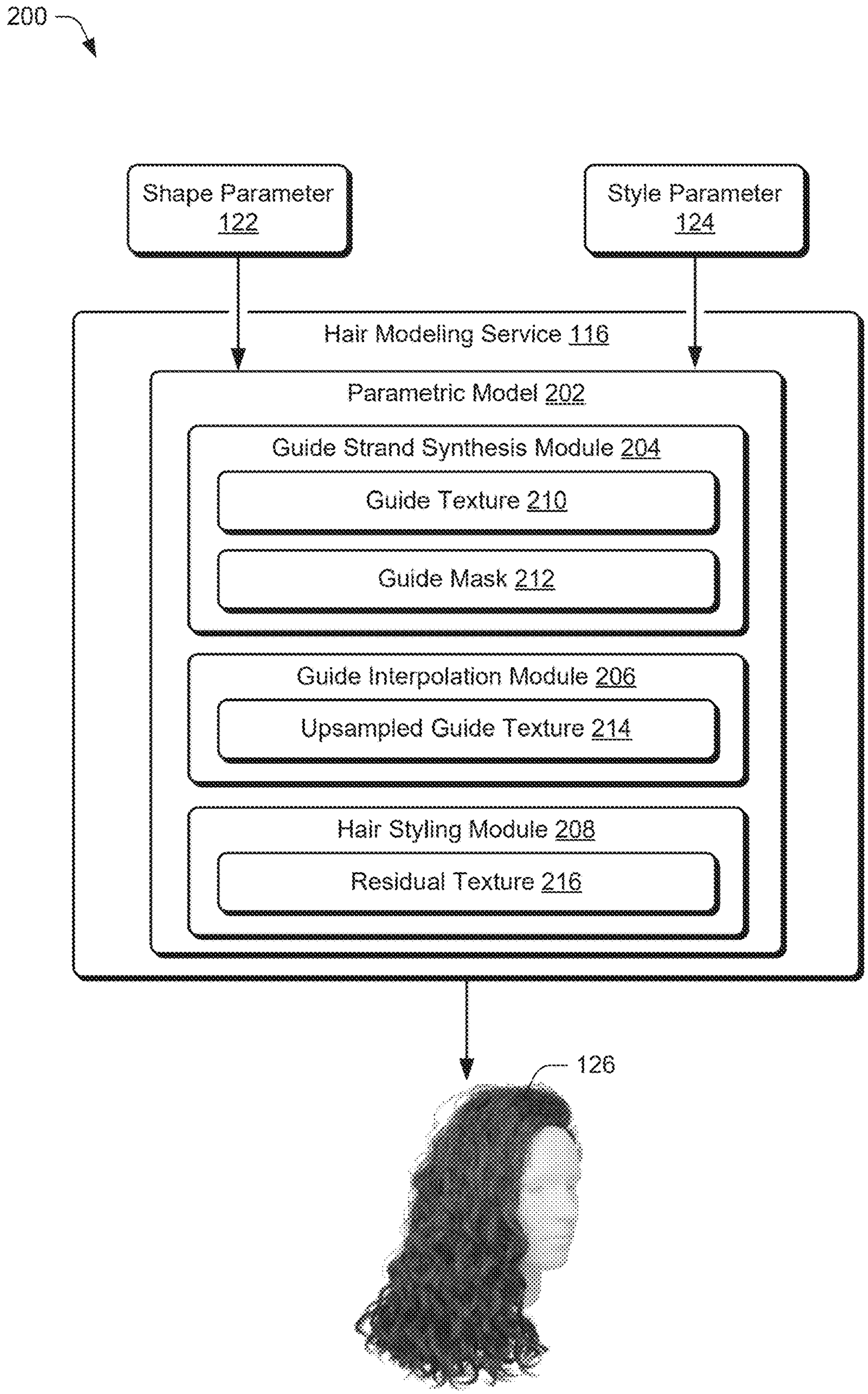
FIG. 2 depicts a system in an example implementation showing operation of a hair modeling system of FIG. 1 in greater detail as employing the techniques described herein.

FIG. 2 depicts a system 200 in an example implementation showing the operation of the hair modeling service 116 of FIG. 1 as employing the techniques described herein. A parametric model 202, which is an example of the machine-learning system 118 of FIG. 1, uses independently controllable parameters to control the global shape, local details, and hair density of its output (e.g., the hair model 126).

A "parametric model" is a type of machine-learning model that represents the relationship between inputs (e.g., shape parameter 122 and style parameter 124) and outputs (e.g., hair model 126) using explicit or implicit parametric functions. The function parameters are adjusted to fit the parametric model to a dataset (e.g., a 3D hair dataset). A parametric model's training or learning process involves finding optimal values for the parameters within the model's structure. After training the parametric model, the input parameters are fitted to truth data (e.g., 3D hair models represented as hair geometry textures). The input parameters are then optimized using gradient descent to complete the parameterization process. The trained parametric model can then perform inference or generation tasks by receiving parameter input values.

The parametric model 202 is formulated as $\mathcal{M}(\vec{\theta}, \vec{\beta}, \mathcal{R})$, where the output hair model 126 is conditioned on the shape parameter 122 $\vec{\theta}$ for its global shape, the style parameter 124 $\vec{\beta}$ for its local details, and a pre-defined root set $\mathcal{R}$ for the hair density. In other implementations, the root set $\mathcal{R}$ is optionally adjusted as an additional input to the parametric model 202. To independently control the global shape and local details, the parametric model 202 employs a strand representation for hair based on PCA in the frequency domain that fits the nearly periodic behavior of individual hair strands.

The learned principal components form a parameterized space for hair decomposition, with initial components capturing low-frequency information. The low-frequency information includes a rough shape and large deformations of a particular hairstyle. Subsequent components in the PCA-based representation encode high-frequency details, such as curliness. For example, the first quantity of PCA coefficients (e.g., 10 coefficients) effectively captures the overall shape of each strand, while the remaining PCA coefficients (e.g., 54 coefficients) represent high-frequency details. Leveraging this decomposition of shape and styling, the parametric model 202 effortlessly smooths a given hairstyle by truncating the PCA coefficients or creating diverse hairstyles by blending the low-rank and high-rank portions of PCA coefficients from different hairstyles.

Based on the strand representation for hair, the parametric model 202 employs a guide strand synthesis module 204, a guide interpolation module 206, and a hair styling module 208 to determine and generate geometry textures for each hair model 126. Hair geometry textures provide a two-dimensional (2D) map representation of hair models that can be learned with machine-learning models. The parametric model 202 uses geometry textures to represent hair strands with multiple frequency components to generate hierarchical hair geometry textures from low- to high-frequency.

In particular, the guide strand synthesis module 204 synthesizes a guide texture 210 and a guide mask 212 from the shape parameter 122. The guide texture 210 represents a 2D downsampled parameterization of hairstyles on the scalp surface as a texture map, where each texel stores the corresponding strand PCA coefficients. The guide mask 212 represents a 2D downsampled baldness map that provides a location of the guide strands. In other words, the guide strand synthesis module 204 decomposes the geometry textures into a guide texture 210 and guide mask 212, collectively representing the guide strands 128. In one implementation, the guide strand synthesis module 204 utilizes a StyleGAN2 model to generate the guide texture 210 and guide mask 212 with a high reconstruction fidelity and diverse textures for global hair shapes.

Hair strands represented as 3D polylines are generally high dimensional. As a result, building parametric models with hair strands often leads to degenerated results and substantial memory consumption. To address this issue, the parametric model 202 defines a low-dimensional parameter space for guide strands 128, reducing training time and processor memory consumption and improving the preservation of strand curvatures in the guide texture 210 and guide mask 212.

The guide interpolation module 206 performs an upsampling process on the guide texture 210 and the guide mask 212 to generate an upsampled guide texture 214. Because the guide strands 128 provide a sparse representation of the full hair model, the guide interpolation module 206 interpolates this sparse set to form the low-frequency part of the hair model 126.

The hair styling module 208 is trained to synthesize a residual texture 216 from the style parameter 124. The residual texture 216 embodies the local strand details as a 2D texture map. In other words, the hair styling module 208 decomposes the geometry textures into the residual texture 216 for local strand details (e.g., wisps 130) and the high-frequency portion of the hair model 126. The hair styling module 208 utilizes a variational autoencoder (VAE) to generate the residual texture 216 with a high reconstruction fidelity and sharp textures for diverse local strand details.

Figure 3:
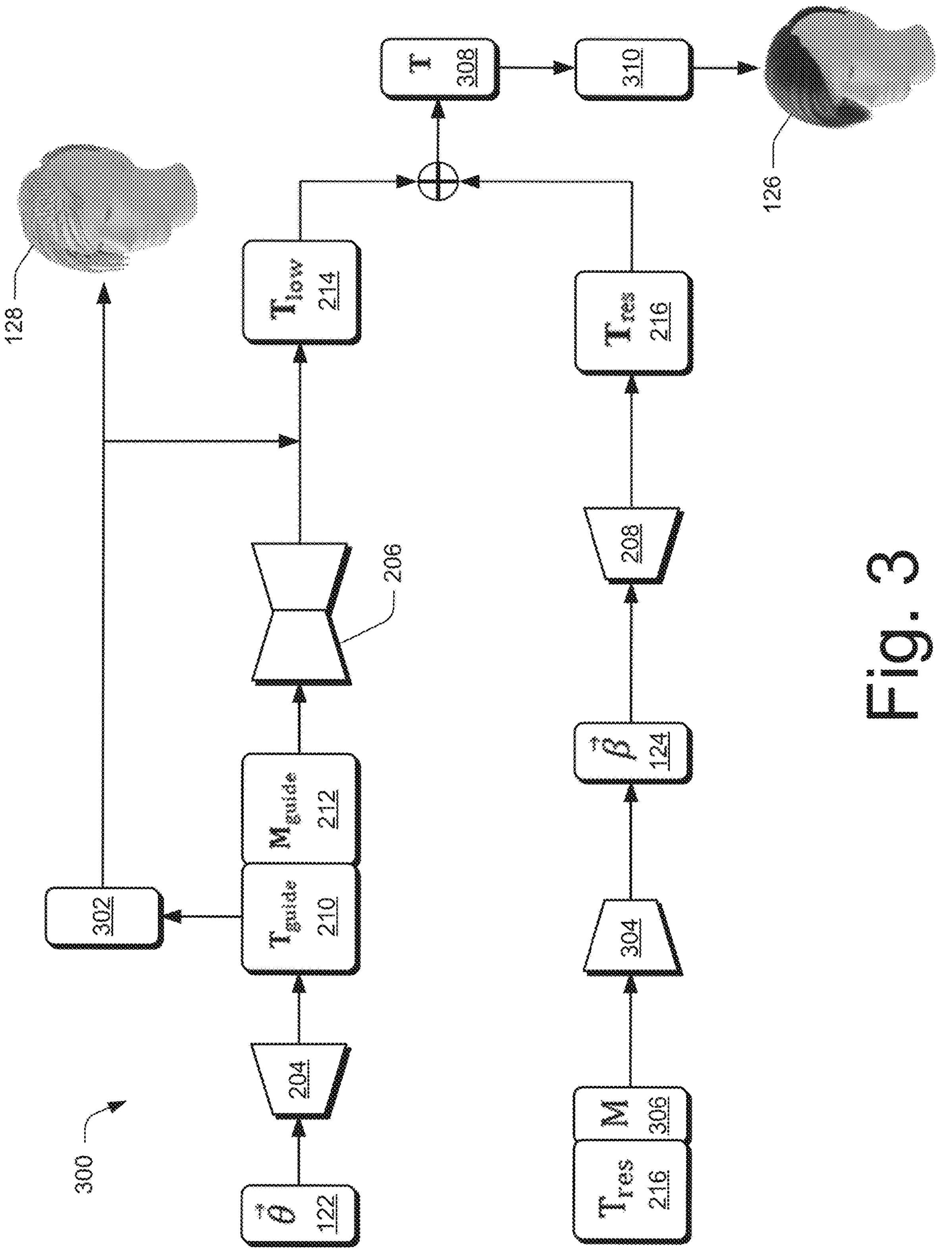
FIG. 3 is a flow diagram depicting an algorithm as a step-by-step procedure in an example implementation of operations performable for accomplishing digital hair generation using a parametric hair model.

The training and inference pipelines for the parametric model 202 to generate realistic hair models are described in greater detail with respect to FIG. 3. In one or more examples, the parametric model 202, guide strand synthesis module 204, guide interpolation module 206, and/or hair styling module 208 are employed after being trained as further described below in relation to FIGS. 3 and 4.

FIG. 3 is a flow diagram depicting an algorithm as a step-by-step procedure 300 in an example implementation of operations performable for accomplishing digital hair generation using a parametric hair model. The procedure 300 utilizes a PCA-based representation of hair strands in the frequency domain.

The parametric model 202 uses a function, $\mathcal{S}(\vec{\gamma})$: $\mathbb{R}^{|\vec{\gamma}|} \mapsto \mathbb{R}^{L\times 3}$, to map the strand PCA coefficients $\vec{\gamma}$ back to 3D polylines with L points (e.g., L is set to 100). The PCA coefficients are used to fit 2D geometry textures to represent the 3D hair, which are further decomposed and parameterized with a guide strand function $\mathcal{G}(\vec{\theta})$ of the guide strand synthesis module 204, a super-resolution function $\mathcal{F}(\cdot)$ of the guide interpolation module 206, and a hair styling function $\mathcal{D}(\vec{\beta})$ of the hair styling module 208, with the shape parameter 122 $\vec{\theta}$ and style parameter 124 $\vec{\beta}$ as controlling parameters. The resulting parametric model 202 is expressed as:

$$\mathcal{M}(\vec{\theta}, \vec{\beta}, \mathcal{R}; \Phi) = \mathcal{S}\left(\text{Sample}\left(\mathcal{R}; \mathcal{F}\left(\mathcal{G}(\vec{\theta})\right)\right) \oplus \mathcal{D}(\vec{\beta})\right), \tag{1}$$

where Sample(·) denotes nearest neighbor interpolation used to sample the synthesized texture with 2D root coordinates in the predefined root set $\mathcal{R}$, $\oplus$ represents the concatenation operation along the feature channels, and $\Phi$ specifies the full set of trainable parameters of the parametric model 202. Once trained, parameters in $\Phi$ are fixed or held constant, and new 3D hairstyles are generated by varying the shape parameter 122 $\vec{\theta}$ and style parameter 124 $\vec{\beta}$ respectively, while the hair density can be adjusted by manipulating the number of roots in $\mathcal{R}$. In one implementation, the dimension of the shape parameter 122 $\vec{\propto}$ and style parameter 124 $\vec{\beta}$ are set to 512 ($|\vec{\theta}|=|\vec{\beta}|=512$), but in other implementations, a different number of dimensions is possible for one or both parameters.

Given the nearly periodic behavior of hair strands, the procedure 300 defines a low-dimensional parameter space based on PCA in the frequency domain to represent 3D hair strands. Specifically, given hair strands represented with a fixed number of points $S=\{p_1, p_2, \ldots, p_L\} \in \mathbb{R}^{L\times 3}$, the parametric model 202 parameterizes the hair strands with a linear function $\mathcal{S}$ in the frequency domain:

$$\mathcal{S}(\vec{\gamma}; X) = iDFT(\bar{S} + \vec{\gamma}^T X) = iDFT\left(\bar{S} + \sum_{n=1}^{|\vec{\gamma}|} \vec{\gamma}_n X_n\right), \tag{2}$$

where $\bar{S}=[\bar{S}_{real}, \bar{S}_{imag}] \in \mathbb{R}^{k\times 3\times 2}$ denotes the mean phase vector of strands in the frequency domain, with $k=\lfloor L/2 \rfloor+1$ representing the number of frequency bands. $X=[X_1, X_2, \ldots, X_{|\vec{\gamma}|}]^T \in \mathbb{R}^{|\vec{\gamma}|\times 6k}$ forms a matrix of orthonormal principal components that capture phase variations in different strands, and iDFT(·) represents the inverse Discrete Fourier Transform that maps strands from the frequency to the spatial domain. As a result, a 3D strand S is represented as a vector of linear coefficients $\vec{\gamma}=[\gamma_1, \ldots, \gamma_{|\vec{\gamma}|}]^T$. In other equations herein, the matrix X is omitted for brevity.

To obtain the quantities in Equation (2), the parametric model 202 applies the Discrete Fourier Transform (DFT) along the x, y, and z axes to all strands in the collected hair models of a data set, and then computes the mean phase vector S and solve the principal components X by performing PCA on the computed Fourier bases. The number of PCA coefficients is generally set at a value that explains most (e.g., 99%) of the variance in the training dataset. In one implementation, the number of PCA coefficients $|\vec{\gamma}|$ is equal to 64.

Some conventional techniques use a VAE to learn a latent space associated with hair strands. The described PCA-based representation of hair strands attains similar or superior performance than these VAE approaches but significantly reduces training time and processor memory consumption due to its analytical computation. In addition, the PCA-based representation provides improved preservation of strand curvatures.

The PCA-based representation provides a meaningful composition of strand geometry by forming a unique parameter space. Specifically, a first subset of PCA coefficients (e.g., the first 10 PCA coefficients) effectively captures the rough shape of each strand. The remaining or a second subset of PCA coefficients (e.g., the other 54 PCA coefficients) encode high-frequency details (e.g., curliness). Leveraging the decomposition of shape and styling, the parametric model 202 can smooth a given hairstyle by truncating its strand PCA coefficients or create diverse hairstyles by blending the low-rank and high-rank portions of PCA coefficients from different hairstyles.

The parametric model 202 stores each hair model as a 2D texture map of strand PCA coefficients. In particular, the parametric model 202 defines a 2D parameterization of hairstyles on the scalp surface as a regular uv texture map, where each texel stores the corresponding strand PCA coefficients $\vec{\gamma}$. These textures are referred to as hair geometry textures, denoted as $T \in \mathbb{R}^{256\times256\times64}$.

Each texel is mapped to the nearest 2D hair root. For those texels with a distance to its nearest hair root above a certain threshold (e.g., $\epsilon=0.01$), the parametric model 202 stores a vector decoded to hair strands with zero length, and mark those texels as a baldness map M. This step ensures there are no missing values in the texture. The parametric model 202 separately models the baldness area as a baldness map $M \in \mathbb{R}^{256\times256}$. In other implementations, T and M have different resolutions depending on a trade-off between size and expressiveness.

Both T and M are downsampled (e.g., to 32×32) to represent guide strands 128 (denoted as the guide texture 210 $T_{guide}$ and guide mask 212 $M_{guide}$), where the low-rank PCA coefficients (e.g., $|\vec{\gamma}_{guide}|=10$) are kept in guide texture 210 $T_{guide}$. Because each texel is not decoded to meaningful strands, guide texture 210 $T_{guide}$ typically includes around 400 strands (or another number). As described below, the parametric model 202 further decomposes and parameterizes the hair geometry textures with separate neural networks to align with existing hair modeling stages, including guide strand synthesis, guide interpolation, and hair styling.

Guide Strand Synthesis

For guide strand synthesis, the guide strand synthesis module 204 trains a neural network to approximate the function, $\mathcal{G}(\vec{\theta}, \phi_1)$: $\mathbb{R}^{|\vec{\theta}|} \mapsto \mathbb{R}^{32\times32\times(10+1)}$, which synthesizes the guide texture 210 $T_{guide}$ and guide mask 212 $M_{guide}$ from the shape parameter 122 $\vec{\theta}$, where $\phi_1$ denotes the trainable network parameters. The guide strand synthesis module 204 employs a generative adversarial network (GAN), which provides an effective generative model in both 2D images and 3D feature tri-planes. The GAN ensures the shape parameter 122 $\vec{\theta}$ follows a normal distribution $\vec{\theta} \sim \mathcal{N}(0,1)$, making it relatively easy to sample. In addition, the intermediate spaces introduced in the GAN allow for more faithful latent embedding, facilitating hair reconstruction either from 3D strands or 2D orientation images.

The output guide texture 210 $T_{guide}$ and guide mask 212 $M_{guide}$ are concatenated and fed into a discriminator, which ensures consistency between the generated texture and mask and helps the generator to place zero-length strands in bald areas. The training objective for the guide strand synthesis module 204 includes a non-saturating GAN loss with $R_1$ regularization on both the texture and mask.

A decoder 302 reconstructs the guide texture 210 $T_{guide}$ and guide mask 212 $M_{guide}$ into the guide strands 128. The decoder 302 uses the linear function δ to convert $T_{guide}$ and $M_{guide}$ from the frequency domain into the spatial domain.

Guide Interpolation

An upsampling process is used to obtain the final hair strands because guide strands 128 provide a sparse representation of the full hair. The upsampling process involves a one-to-many mapping, with the same guide strands 128 being upsampled to yield diverse hairstyles with varying strand randomness and curliness. An orthogonal decomposition of the global hair shape and local strand details is used for the one-to-many mapping. In particular, the parametric model 202 further decomposes the hair geometry texture T into the upsampled guide texture 214 $T_{low} \in \mathbb{R}^{256\times256\times10}$ and the residual texture 216 $T_{res} \in \mathbb{R}^{256\times256\times54}$ by splitting along the feature channels. $T_{low}$ encapsulates the global hair shape, while $T_{res}$ embodies the local strand details or residual texture.

With a texture-based representation for 3D hair, guide interpolation becomes an image super-resolution technique, which can be defined as the super-resolution function $\mathcal{F}(T_{guide}, M_{guide}; \phi_2)$: $\mathbb{R}^{32\times32\times11} \mapsto \mathbb{R}^{256\times256\times10}$ performed by the guide interpolation module 206, with trainable network parameters $\phi_2$. The super-resolution function operates as a deterministic mapping without parameter control.

To approximate the super-resolution function, the guide interpolation module 206 trains a U-Net on the bilinearly upsampled textures, translating them to 14-channel weight maps. The first four channels represent the weight vector $\vec{\omega}$ for the four neighboring strands, and the last ten channels represent a residual vector $\vec{\delta}$ to correct the blended coefficients. As a result, the final coefficient $\vec{\gamma}_{low}$ can be calculated as:

$$\vec{\gamma}_{low} = \vec{\omega}^{\top}\gamma_{guide} + \vec{\delta} = \sum_{n=1}^{4} \omega_n \vec{\gamma}^{\,n}_{guide}\vec{\gamma}_n + \vec{\delta}. \quad (3)$$

The weight-based blending output allows the U-Net of the guide interpolation module 206 to converge to a sharper result than directly predicting coefficients.

The U-Net is trained in a supervised manner, employing both an $L_1$ loss for the upsampled guide texture 214 $T_{low}$ and a geometric loss $\mathcal{L}_{geo}$ for the decoded strand geometry. Specifically, the geometric loss $\mathcal{L}_{geo}$ encompasses an $L_1$ loss for the point position $\hat{p}_n$, a cosine distance for the orientation $\hat{d}_n=\hat{p}_{n+1}-\hat{p}_n$, and an $L_1$ loss for the curvature, which is represented as the $L_2$ norm of binormal vector $\hat{b}_n=\|\hat{d}_n\times\hat{d}_{n+1}\|_2$;

$$\mathcal{L}_{geo} = \sum_{n=1}^{L} \|\hat{p}_n - p_n\|_1 + (1 - \hat{d}_n \cdot d_n) + \|\hat{b}_n - b_n\|_1. \quad (4)$$

A regularization term is also included to constrain the residual vector $\vec{\delta}$ towards 0. The overall loss function, denoted as $\mathcal{L}_{superres}$, can then be expressed as:

$$\mathcal{L}_{superres} = \lambda_{tex}\|\hat{T}_{low} - T_{low}\|_1 + \lambda_{geo}\mathcal{L}_{geo} + \lambda_{reg}\|\vec{\delta}\|_2^2, \quad (5)$$

where the weighting factors $\lambda_{tex}$, $\lambda_{geo}$, and $\lambda_{reg}$ are set to 1, 1, and 0.1, respectively, in one implementation.

Hair Styling

For hair styling, a neural network of the hair styling module 208 is trained to approximate local details (e.g., high-frequency curliness and randomness) using a hair styling function $\mathcal{D}$. The hair styling function is defined as $\mathcal{D}(\vec{\beta}, \phi_3)$: $\mathbb{R}^{|\vec{\beta}|} \mapsto \mathbb{R}^{256\times256\times54}$, where the residual texture $T_{res}$ is synthesized from the style parameter 124 $\vec{\beta}$, and $\phi_3$ represents the trainable network parameters.

For parameterization, the parametric model 202 utilizes a VAE 304 and the decoder of the hair styling module 208 takes the same architecture as the GAN described above. Specifically, the encoder $\varepsilon$ of the VAE 304 projects the residual texture $T_{res}$ and baldness map 306 M into the latent space as the style parameter 124 $\vec{\beta}$, where the latent vectors will then be used to modulate the decoder to reconstruct the input. A similar loss function as Equation 5 is defined as the training objective for the VAE 304, which is expressed as:

$$\mathcal{L}_{res} = \lambda_{tex}(\|\hat{T}_{res} - T_{res}\|_1 + \|\hat{M} - M\|_1) + \lambda_{geo}\mathcal{L}_{geo} + \lambda_{KL}\mathcal{L}_{KL}, \quad (6)$$

where the reconstruction terms are computed on the residual texture 216, baldness map 306, and decoded strand geometry. The weighting factors $\lambda_{tex}$, $\lambda_{geo}$, and $\lambda_{KL}$ are set to 10, 1, and 1e-4, respectively, in one implementation.

After synthesizing residual textures 216 $T_{res}$, the residual textures 216 $T_{res}$ are concatenated with the upsampled guide textures 214 $T_{low}$, composing the final hair geometry textures 308 T. The geometry texture 308 T is then sampled and decoded for the final strand geometry of the hair model 126. Specifically, a decoder 310 reconstructs the geometry texture 308 T into the hair model 126. The decoder 310 uses the linear function $\mathcal{S}$ to convert from the frequency domain into the spatial domain.

Figure 4:
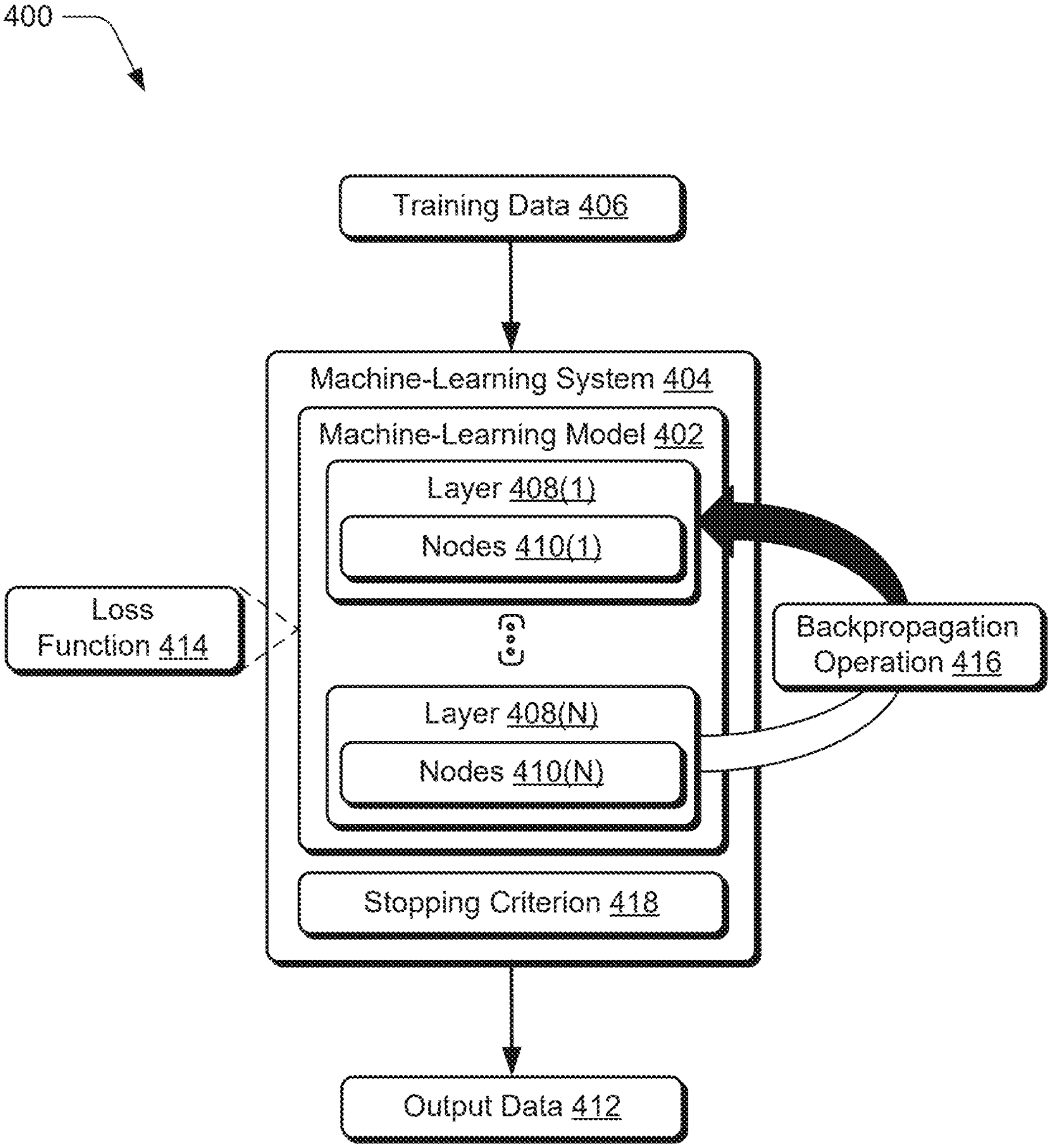
FIG. 4 depicts a system and procedure in an example implementation for training a machine-learning model.

FIG. 4 depicts a system and procedure in an example implementation 400 for training a machine-learning model 402 as part of the machine-learning system 118 of FIG. 1 or the parametric model 202, the guide strand synthesis module 204, the guide interpolation module 206, or the hair styling module 208 of FIG. 2. The machine-learning model 402 is illustrated as implemented as part of a machine-learning system 404. The machine-learning system 404 is representative of functionality to generate training data 406, use the generated training data 406 to train the machine-learning model 402, and/or use the trained machine-learning model 402 as implementing the functionality described herein.

As described above, machine-learning models and parametric models are configurable to perform a wide range of image-related tasks without being explicitly programmed for each one. To train the parametric model, the underlying machine-learning model 402 is provided with training data 406 that includes examples of images and/or hair datasets to train and retrain the model to generate desired images and/or hair models. Over time, the model, once trained, is configured to generate hair models that are coherent, contextually relevant, and mimic the style and content of the training data, and so forth.

In the illustrated example, the machine-learning model 402 is configured using a plurality of layers 408(1), . . . , 408(N) having, respectively, a plurality of nodes 410(1), . . . , 410(N). The plurality of layers 408(1)-408(N) are configurable to include an input layer, an output layer, and one or more hidden layers. Calculations are performed by the nodes 410(1)-410(N) within the layers via hidden states through a system of weighted connections that are "learned" during training to implement a variety of tasks (e.g., hair generation).

In order to train the machine-learning model 402, training data 406 is received that provides examples of "what is to be learned" by the machine-learning model 402, i.e., as a basis to learn patterns from the data. The machine-learning system 404, for instance, collects and preprocesses the training data 406 that includes input features and corresponding target labels, i.e., of what is exhibited by the input features. The machine-learning system 404 then initializes the parameters of the machine-learning model 402, which the machine-learning system 404 uses as internal variables to represent and process information during training and represent interferences gained through training. In an implementation, the training data 406 is separated into batches to improve the processing and optimization efficiency of the parameters during training. In another implementation, data augmentation is performed on an initial training data set to improve the diversity of the training data 406. For example, the data augmentation includes blending different hair models within the same style class together to produce new hairstyles, which are further augmented by horizontal flipping to increase the data samples further.

The training data 406 is then received as input and used to generate predictions based on the current state of parameters of layers 408(1)-408(N) and corresponding nodes 410(1)-410(N) of the model. The machine-learning model 402 outputs its result as output data 412. Output data 412 describes an outcome of the task (e.g., generating a target digital video).

Training the machine-learning model 402 includes calculating a loss function 414 to quantify a loss associated with operations performed by nodes 410 of the machine-learning model 402. Calculating the loss function 414, for instance, includes comparing a difference between predictions specified in the output data 412 with target labels specified by the training data 406. The loss function 414 is configurable in a variety of ways, including regression, the quadratic loss function as part of a least squares technique, and so forth.

Calculating the loss function 414 also includes using a backpropagation operation 416 to minimize the loss function 414, thereby training the parameters of the machine-learning model 402. Minimizing the loss function 414 includes adjusting the weights of the nodes 410(1)-410(N) in order to minimize the loss and thereby optimize the performance of the machine-learning model 402 for a particular task. The adjustment is determined by computing a gradient of the loss function 414, which indicates a direction to be used in order to adjust the parameters for minimizing the loss. The parameters of the machine-learning model 402 are then updated based on the computed gradient.

This process continues over a plurality of iterations until a stopping criterion 418 is met. The stopping criterion 418 is employed by the machine-learning system 404 in this example to reduce overfitting of the machine-learning model 402, reduce computational resource consumption, and promote an ability to address previously unseen data, i.e., that is not included specifically as an example in the training data 406. Examples of a stopping criterion 418 include but are not limited to a predefined number of epochs, validation loss stabilization, achievement of a performance improvement threshold, or based on performance metrics such as precision and recall.

For example, after training, the parametric model 202 can fit the shape parameter 122 $\vec{\theta}$ and style parameter 124 $\vec{\beta}$ to 3D hair models represented as hair geometry textures. Given the full differentiability of the parametric model 202, these parameters are optimized using gradient descent, where the objective is expressed as:

$$\vec{\theta}^*, \vec{\beta}^* := \arg\min_{\vec{\theta},\vec{\beta}} \left\| \mathcal{M}\left(\vec{\theta}, \vec{\beta}, \mathcal{R}\right) - \mathcal{T} \right\|_1 + \mathcal{L}_{geo}$$

Even if a target hair model does not include guide strands 128, the parametric model 202 can generate reasonable guide strands 128 to depict the fitted target, which is obtained directly from $\mathcal{G}(\vec{\theta}^*)$.

Figure 5:
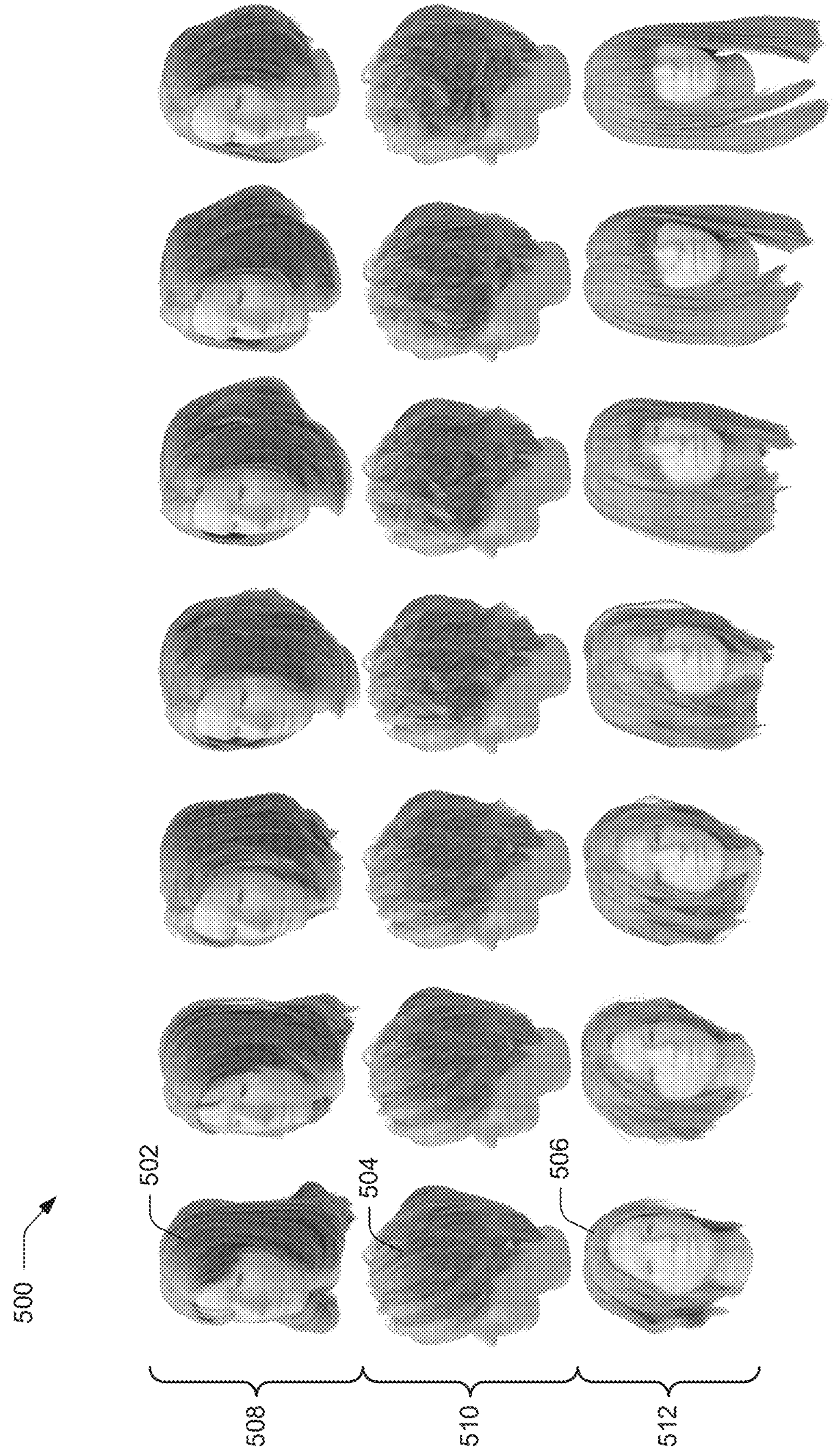
FIG. 5 depicts multiple example implementations for generating digital hairstyles using the hair modeling system as employing the techniques described herein.

FIG. 5 depicts multiple example implementations 500 for generating digital hairstyles using the hair modeling system as employing techniques described herein. By introducing separate parameters (e.g., the shape parameter 122 and the style parameter 124) to control the global hair shape and local strand details, the parametric model can edit the hair model 126 with varying granularity by interpolating the corresponding parameters. For example, the parametric model 202 of the hair modeling system (e.g., the hair modeling service 116 of FIG. 1) receives hairstyles 502, 504, and 506 as inputs. In other implementations, the hairstyles 502, 504, and/or 506 are outputs of the parametric model 202, which are then interpolated to generate modified hairstyles.

For hairstyles 508, the parametric model 202 linearly interpolates the shape parameter 122 $\vec{\theta}$ for hairstyle 502, resulting in hairstyles with different global shapes. Because the style parameter 124 $\vec{\beta}$ is held constant or fixed, local strand details, such as curls at the tips of strands, remain unchanged. and/or the style parameter 124.

For hairstyles 510, the parametric model 202 linearly interpolates the style parameter 124 $\vec{\beta}$ for hairstyle 504, resulting in hairstyles with different styles ranging from straight to curly. Because the shape parameter 122 $\vec{\theta}$ is held constant or fixed, the global hair shape is unchanged.

For hairstyles 512, the parametric model 202 linearly interpolates the shape parameter 122 $\vec{\theta}$ and the style parameter 124 $\vec{\beta}$ for hairstyle 506, demonstrating a transition from a short wavy hairstyle to a long straight hairstyle.

Figure 6:
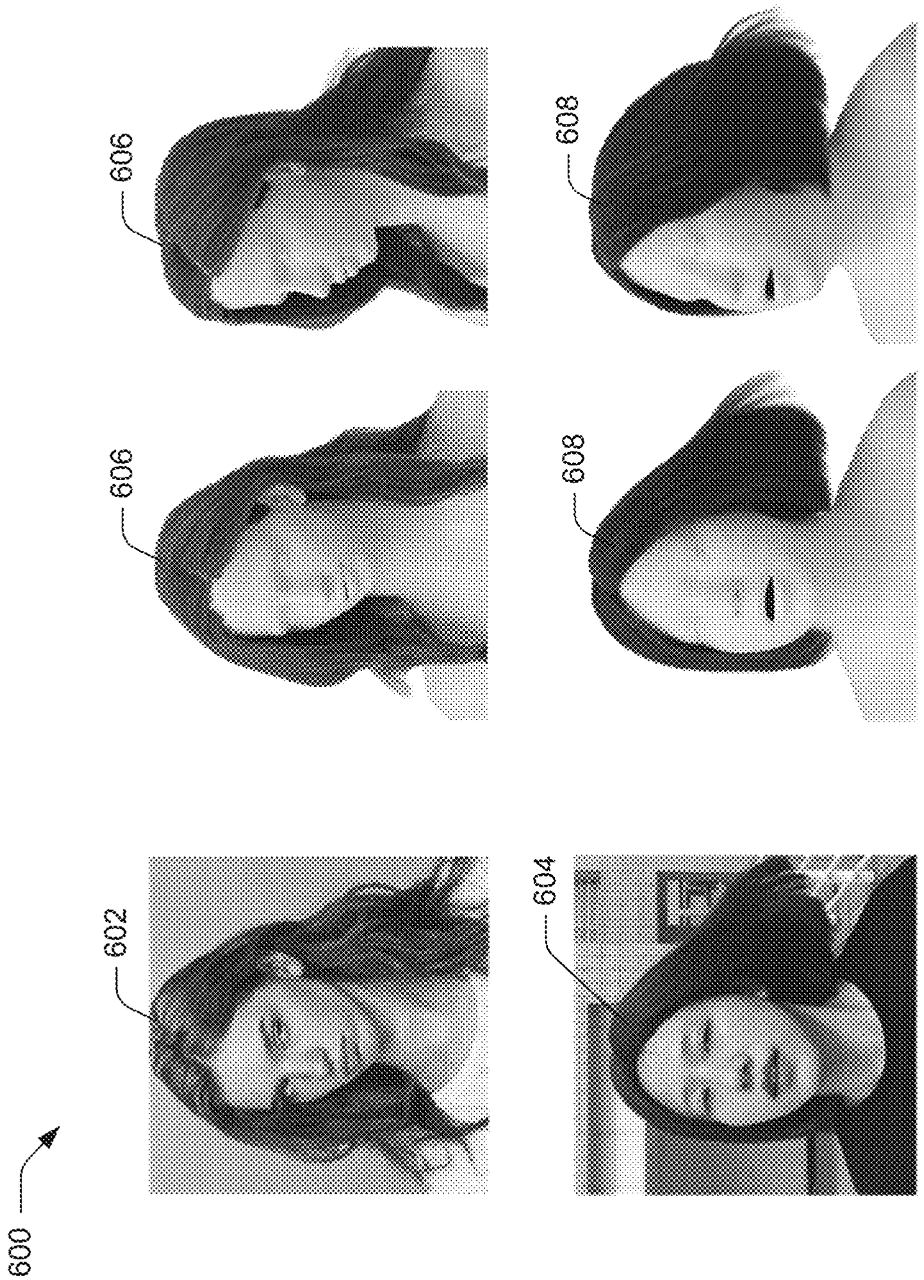
FIG. 6 depicts multiple example implementations for digitally reconstructing a hairstyle from a digital image using the hair modeling system as employing the techniques described herein.

FIG. 6 depicts multiple example implementations 600 for digitally reconstructing a hairstyle from a digital image using the hair modeling system as employing the techniques described herein. Input digital images are photographs of persons with different hairstyles, including a first hairstyle 602 and a second hairstyle 604. With 2D observations from the photographs as input, the parametric model 202 digitally reconstructs 3D hair by optimizing the shape parameter 122 and style parameter 124 to recreate the first hairstyle 602 and the second hairstyle 604. In particular, the parameters are optimized to minimize the differences when the generated 3D hair is projected onto the 2D images associated with the first hairstyle 602 and the second hairstyle 604.

Given the input images, the parametric model 202 estimates the face and shoulder geometry and segments hair from the image to compute a strand map. The strand map depicts the 2D pixel-wise hair orientations. To fit 3D hair to 2D orientations, the parametric model 202 uses a differentiable rendering pipeline, in which a transformation between a predefined head mesh and the face/shoulder geometry is computed. The transformation places strand polylines generated by the parametric model 202 onto the face/shoulder geometry. A cylinder mesh is then attached to each strand segment, and a 3D orientation of each vertex is computed as the per-vertex feature. The vertex features are projected and rendered with the estimated camera parameters to obtain a rendered hair mask and strand map. By computing a pixel-wise mask loss and strand map loss, gradients are back-propagated to optimize the shape parameter 122 and style parameter 124 with decoupled weight decay regularization. A penetration loss is also applied to penalize hair intersecting the body geometry.

Accordingly, the parametric model 202 digitally reconstructs the first hairstyle 602 as digital hairstyle 606, with FIG. 6 providing a front and side view of digital hairstyle 606. Similarly, the parametric model 202 digitally reconstructs the second hairstyle 604 as digital hairstyle 608, with FIG. 6 providing a front and side view of digital hairstyle 608. The parametric model 202 faithfully reconstructs the reference hairstyle's overall shape and local details.

Figure 7:
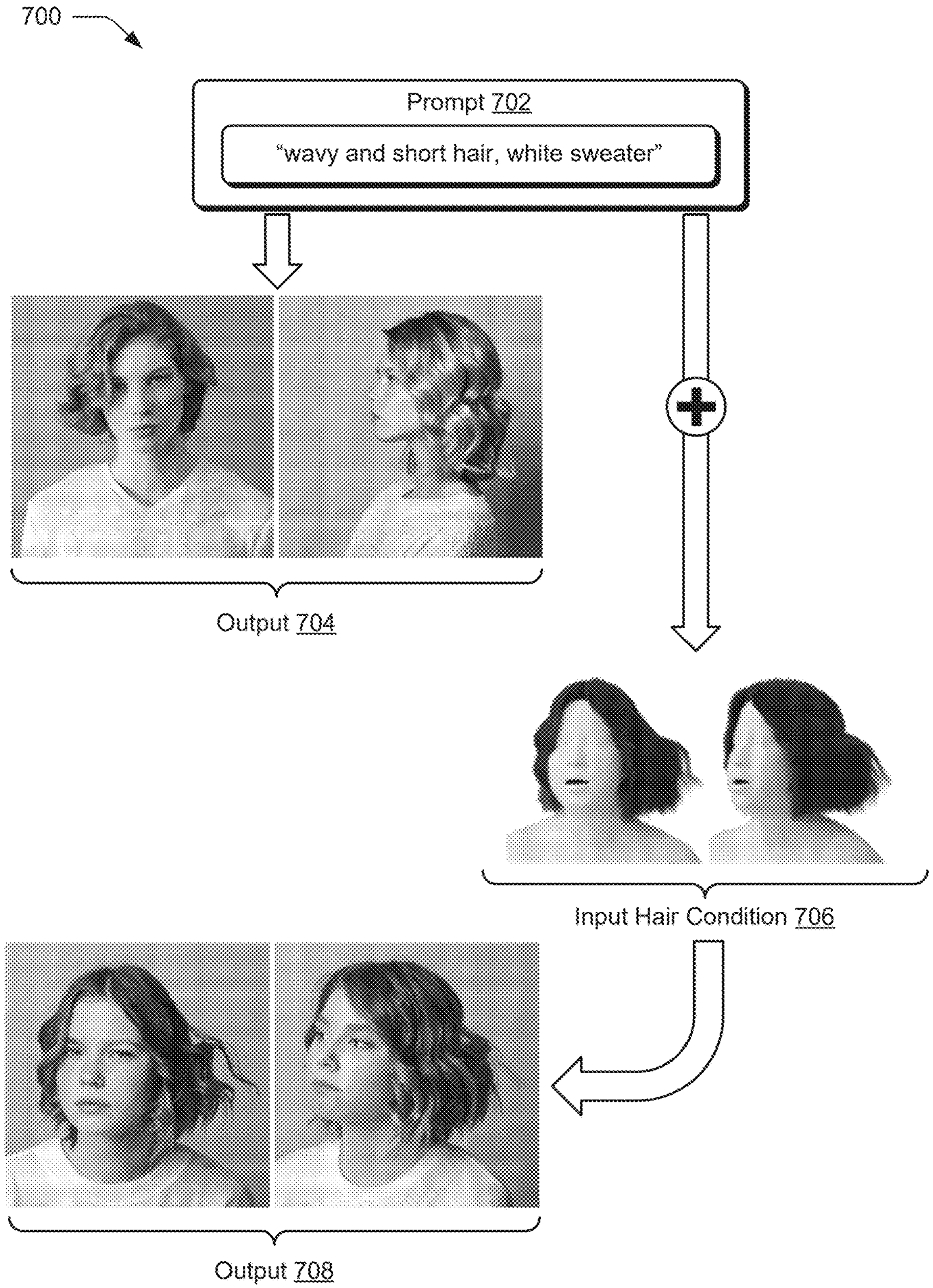
FIG. 7 depicts multiple example implementations for digital image generation with and without hairstyle conditions employing the techniques described herein.

FIG. 7 depicts multiple example implementations 700 for digital image generation with and without hairstyle conditions employing the techniques described herein. Images are generated using a generative machine-learning model with a prompt 702. In this example, prompt 702 includes the text "wavy and short hair, white sweater." Additional text prompts like "front face" or "side face" are appended to the prompt 702 to obtain desired head poses in the generated images.

In the first scenario, the machine-learning model generates output 704 showing a girl with a wave and short hair. Each image in the output 704 includes slightly different overall shapes. Without the prompt including hair conditioning, images generated with short text prompts like "wavy and short hair" cannot guarantee the generation of the desired hairstyle.

In the second scenario, an input hair condition 706 is appended to the prompt 702. Leveraging the rich information encoded in the 3D hair geometry of the input hair condition 706, the generated output 708 provides a girl with a hairstyle that is the same overall shape as the input hair condition 706, with the styling consistent with the prompt 702 (e.g., wavy hair).

Example Video Generation Procedures

The following discussion describes hair modeling techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm, e.g., responsive to execution of the instructions. In portions of the following discussion, reference will be made to FIGS. 1-7.

Figure 8:
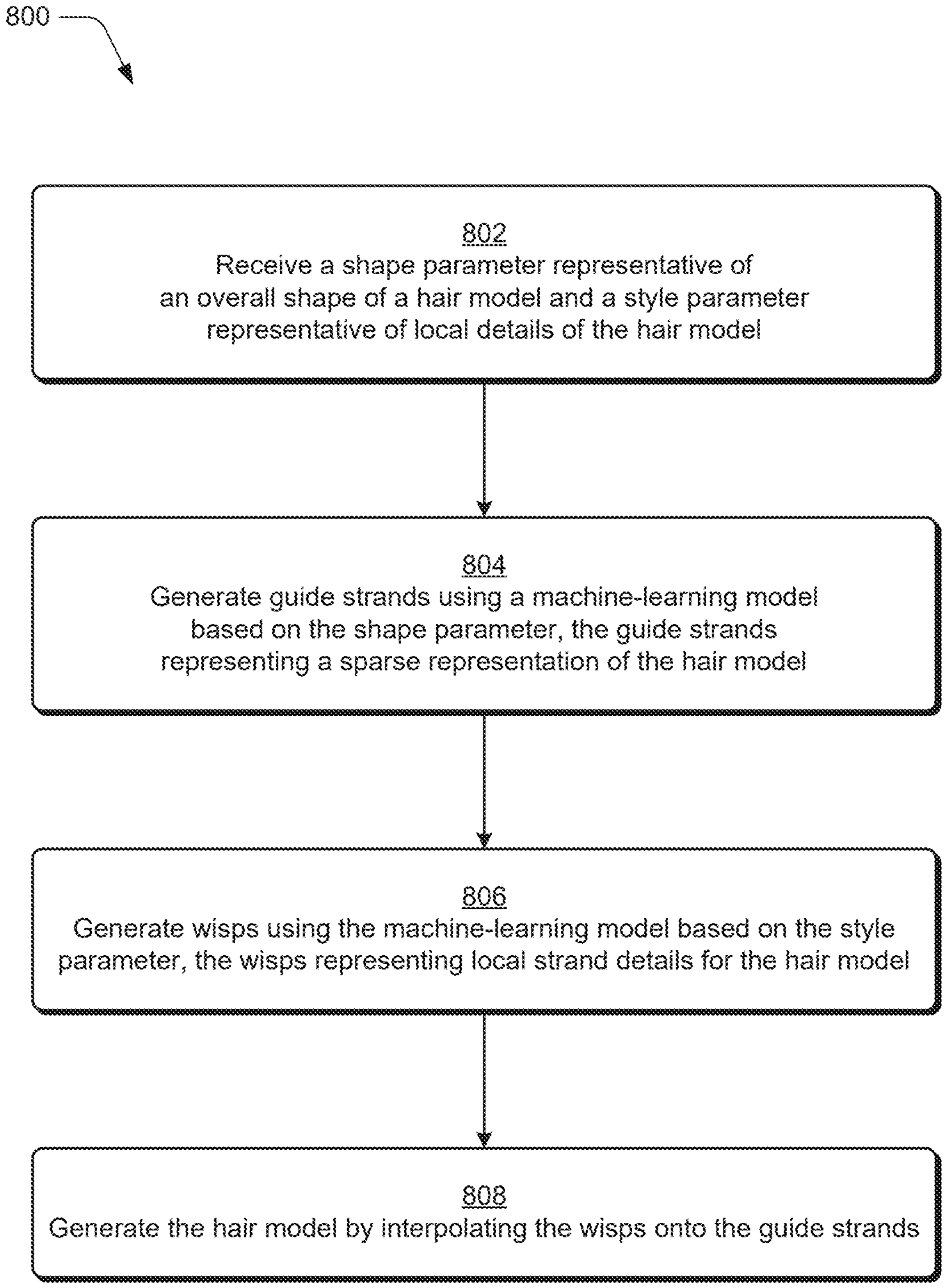
FIG. 8 is a flow diagram depicting an algorithm as a step-by-step procedure in an example implementation of operations performable for accomplishing a result of digital hair generation using a parametric model.

FIG. 8 is a flow diagram depicting an algorithm as a step-by-step procedure 800 in an example implementation of operations performable for accomplishing a result of digital hair generation using a parametric model. To begin in this example, a processing device receives a shape parameter representative of an overall shape of a hair model and a style parameter representative of the local details of the hair model (block 802). The shape parameter 122 provides a parameterized representation of the global shape of a target hair model 126. Similarly, the style parameter 124 parameterizes local strand details for the hair model 126.

A machine-learning model generates guide strands based on the shape parameter (block 804). The guide strands 128 provide a sparse strand representation of the hair model 126. The machine-learning model also generates wisps based on the style parameter (block 806). The wisps 130 provide local strand details for the hair model 126. The processing device then generates the hair model by interpolating the wisps onto the guide strands (block 808).

Example System and Device

Figure 9:
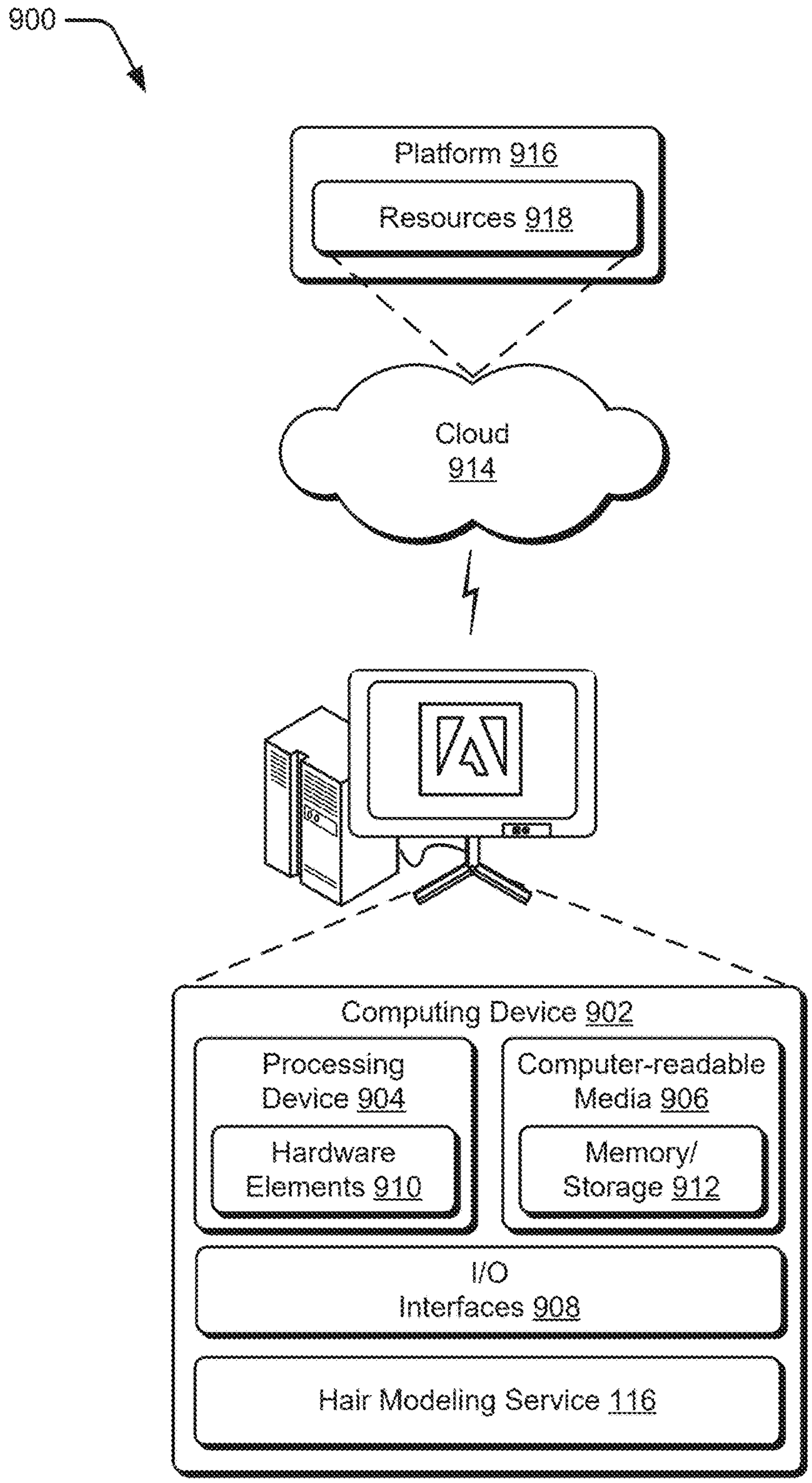
FIG. 9 illustrates an example system including various components of an example device that can be implemented as any type of computing device as described and/or utilize with reference to the previous figures to implement embodiments of the techniques described herein.

FIG. 9 illustrates an example system 900 that includes an example computing device 902 that is representative of one or more computing systems and/or devices usable to implement the various techniques described herein. This is illustrated through the inclusion of the hair modeling service 116. The computing device 902 is configurable, for example, as a server of a service provider, a device associated with a client (e.g., a client device), an on-chip system, and/or any other suitable computing device or computing system.

The example computing device 902, as illustrated, includes a processing system 904, one or more computer-readable media 906, and one or more I/O interfaces 908 that are communicatively coupled, one to another. Although not shown, the computing device 902 further includes a system bus or other data and command transfer system that couples the various components from one to another. For example, a system bus includes any combination of different bus structures, such as a memory bus or memory controller, a peripheral bus, a universal serial bus, and/or a processor or local bus that utilizes various bus architectures. A variety of other examples are also contemplated, such as control and data lines.

The processing system 904 is representative of the functionality to perform one or more operations using hardware. Accordingly, the processing system 904 is illustrated as including hardware elements 910 that are configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. Memory/storage 912 represents memory or storage capacity associated with one or more computer-readable media. In one example, the memory/storage 912 includes volatile media (such as random access memory (RAM)) and/or nonvolatile media (such as read-only memory (ROM), Flash memory, optical disks, magnetic disks, and so forth). In another example, the memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways, as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways, as further described below, to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are stored on or transmitted across some form of computer-readable media. For example, the computer-readable media includes a variety of media accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal-bearing media. The computer-readable storage media includes hardware such as volatile and non-volatile, removable and non-removable media, and/or storage devices implemented in a method or technology suitable for storage of information such as computer-readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium configured to transmit instructions to the hardware of the computing device 902, such as via a network. Signal media typically embodies computer-readable instructions, data structures, program modules, or other data in a modulated data signal, such as carrier waves, data signals, or other transport mechanisms. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic, and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as hardware utilized to store instructions for execution, e.g., the computer-readable storage media described previously.

Combinations of the foregoing are also employable to implement various techniques described herein. Accordingly, software, hardware, or executable modules are implementable as instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through the use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through the use of a distributed system, such as over a "cloud" 914, as described below.

The cloud 914 includes and/or is representative of a platform 916 for resources 918. The platform 916 abstracts the underlying functionality of hardware (e.g., servers) and software resources of the cloud 914. For example, the resources 918 include applications and/or data that are utilized while computer processing is executed on servers remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources implemented via the platform. Accordingly, in an interconnected device embodiment, the implementation of functionality described herein is distributable throughout the system 900. For example, the functionality is implementable in part on the computing device 902 as well as via the platform 916 that abstracts the functionality of the cloud 914.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

What is claimed is:

1. A method comprising:

receiving, by a processing device, a shape parameter representative of an overall shape of a hair model and a style parameter representative of local strand details of the hair model, the shape parameter and the style parameter being disentangled using a principal component analysis (PCA)-based strand representation in a frequency domain;

generating, using a machine-learning model, guide strands based on the shape parameter, the guide strands providing a sparse low-frequency representation of the hair model;

generating, using the machine-learning model, wisps based on the style parameter, the wisps providing high-frequency local strand details for the hair model; and generating, by the processing device, the hair model by interpolating the wisps onto the guide strands.

2. The method of claim 1, wherein generating the guide strands based on the shape parameter comprises:

generating, using a first neural network of the machine-learning model, a guide texture and a guide mask based on the shape parameter, the guide texture providing a first two-dimensional (2D) texture map of the guide strands in the a frequency domain, the guide mask providing a location of the guide strands; and generating, using a second neural network of the machine-learning model, an upsampled guide texture based on a concatenation of the guide texture and the guide mask, the upsampled guide texture providing a second 2D texture map for the overall shape of the hair model in the frequency domain.

3. The method of claim 2, wherein generating the wisps based on the style parameter comprises generating, using a third neural network of the machine-learning model, a residual texture based on the style parameter, the residual texture providing a third 2D texture map of the local strand details in the frequency domain.

4. The method of claim 3, wherein:

the first neural network includes a generative adversarial network;

the second neural network includes a super-resolution U-Net; and the third neural network includes a variational autoencoder (VAE).

5. The method of claim 3, wherein generating the hair model by interpolating the wisps onto the guide strands comprises:

generating a geometry texture by concatenating the residual texture with the upsampled guide texture; and sampling, using nearest neighbor interpolation, and decoding, using an inverse discrete Fourier Transform, the geometry texture to generate the hair model.

6. The method of claim 5, wherein a set of points representing three-dimensional (3D) hair strands of the hair model are parameterized with a linear function in the frequency domain, each 3D hair strand being represented as a vector of linear coefficients.

7. The method of claim 6, wherein a first subset of the linear coefficients represents the overall shape of the 3D hair strand and a second subset of the linear coefficients represents the local strand details of the 3D hair strand.

8. The method of claim 6, wherein each texel of the geometry texture stores corresponding linear coefficients for a nearest hair root in the frequency domain.

9. The method of claim 1, wherein training the machine-learning model includes fitting the shape parameter and the style parameter to a set of 3D hair models.

10. The method of claim 1, wherein the method further comprises generating an updated hair model by:

modifying a value of the shape parameter to change the overall shape of the hair model;

modifying a value of the style parameter to change the local strand details of the hair model; or modifying the value of the shape parameter to change the overall shape of the hair model and the value of the style parameter to change the local strand details of the hair model.

11. The method of claim 1, wherein the method further comprises:

receiving a digital image of a hairstyle; and determining, using the machine-learning model, a first value of the shape parameter and a second value of the style parameter that results in the hair model that recreates the hairstyle.

12. The method of claim 11, wherein the first value and the second value are optimized to minimize differences when the hair model is projected onto the hairstyle in the digital image.

13. The method of claim 1, wherein the hair model is combined with a text prompt to a generative model to generate, based on the text prompt, a digital image or digital video of a human with a hairstyle having the overall shape and the local strand details of the hair model.

14. A computing device comprising:

a processing device; and a computer-readable medium storing instructions that, in response to execution by the processing device, cause the processing device to perform operations including:

receive a shape parameter representative of an overall shape of a hair model and a style parameter representative of local strand details of the hair model, the shape parameter and the style parameter being disentangled using a principal component analysis (PCA)-based strand representation in a frequency domain;

generate, using a machine-learning model, a geometry texture based on the shape parameter and the style parameter, the geometry texture including a two-dimensional (2D) texture map of a low-frequency representation of the overall shape and a high-frequency representation of local strand details for the hair model in the frequency domain; and sample and transform the geometry texture from the frequency domain to a spatial domain to generate the hair model.

15. The computing device of claim 14, wherein the computer-readable medium stores further instructions that, in response to execution by the processing device, cause the processing device to generate the geometry texture based on the shape parameter and the style parameter by:

generating, using a first neural network of the machine-learning model, a guide texture and a guide mask based on the shape parameter, the guide texture providing a first 2D texture map of guide strands in the frequency domain, the guide mask providing a location of the guide strands;

generating, using a second neural network of the machine-learning model, an upsampled guide texture based on a concatenation of the guide texture and the guide mask, the upsampled guide texture providing a second 2D texture map for the overall shape of the hair model in the frequency domain;

generating, using a third neural network of the machine-learning model, a residual texture based on the style parameter, the residual texture providing a third 2D texture map of the local strand details in the frequency domain; and generating the geometry texture by concatenating the residual texture with the upsampled guide texture.

16. The computing device of claim 15, wherein a hair strand of the hair model is represented in the geometry texture as a vector of linear coefficients, a first subset of the linear coefficients represents the overall shape of the hair strand and a second subset of the linear coefficients represents the local strand details of the hair strand.

17. The computing device of claim 14, wherein training the machine-learning model includes fitting the shape parameter and the style parameter to a set of 3D hair models.

18. The computing device of claim 14, wherein the computer-readable medium stores further instructions that, in response to execution by the processing device, cause the processing device to modify a value of the shape parameter to change the overall shape of the hair model or a value of the style parameter to change the local strand details of the hair model.

19. The computing device of claim 14, wherein the computer-readable medium stores further instructions that, in response to execution by the processing device, cause the processing device to:

receive a digital image of a hairstyle; and determine, using the machine-learning model, a first value of the shape parameter and a second value of the style parameter that results in the hair model that recreates the hairstyle, the first value and the second value being optimized to minimize differences when the hair model is projected onto the hairstyle in the digital image.

20. One or more non-transitory computer-readable media storing instructions that, responsive to execution by a processing device, cause the processing device to perform operations comprising:

receiving a shape parameter representative of an overall shape of a hair model and a style parameter representative of local strand details of the hair model, the shape parameter and the style parameter being disentangled using a principal component analysis (PCA)-based strand representation in a frequency domain;

generating, using a machine-learning model, guide strands based on the shape parameter, the guide strands providing a sparse low-frequency representation of the hair model;

generating, using the machine-learning model, wisps based on the style parameter, the wisps providing high-frequency local strand details for the hair model; and generating, by the processing device, the hair model by interpolating the wisps onto the guide strands.

* * * * *